US007310700B2

(12) United States Patent
Yada et al.

(10) Patent No.: US 7,310,700 B2
(45) Date of Patent: *Dec. 18, 2007

(54) MICROCOMPUTER, PROGRAMMING METHOD AND ERASING METHOD

(75) Inventors: Naoki Yada, Sayama (JP); Eiichi Ishikawa, Higashimurayama (JP)

(73) Assignees: Renesas Technology Corp., Tokyo (JP); Hitachi Hokkai Semiconductor, Ltd., Hokkaido (JP)

(*) Notice: Subject to any disclaimer, the term of this patent is extended or adjusted under 35 U.S.C. 154(b) by 0 days.

This patent is subject to a terminal disclaimer.

(21) Appl. No.: 11/672,468

(22) Filed: Feb. 7, 2007

(65) Prior Publication Data

US 2007/0130416 A1  Jun. 7, 2007

Related U.S. Application Data

(63) Continuation of application No. 11/037,261, filed on Jan. 19, 2005, now Pat. No. 7,194,571, which is a continuation of application No. 10/080,681, filed on Feb. 25, 2002, now abandoned.

(30) Foreign Application Priority Data

Mar. 30, 2001  (JP) .............................. 2001-097808

(51) Int. Cl.
 *G06F 12/00* (2006.01)
(52) U.S. Cl. ...................................... 711/103; 711/115
(58) Field of Classification Search ...................... None
 See application file for complete search history.

(56) References Cited

U.S. PATENT DOCUMENTS

| 5,355,464 | A | 10/1994 | Fandrich et al. ............ 365/218 |
|---|---|---|---|
| 5,444,664 | A | 8/1995 | Kuroda et al. .............. 365/226 |
| 5,581,503 | A | 12/1996 | Matsubara et al. ..... 365/185.33 |
| 5,802,343 | A | 9/1998 | Fandrich et al. ............ 711/158 |
| 5,805,501 | A | 9/1998 | Shiau et al. ........... 365/185.29 |
| 5,809,541 | A | 9/1998 | Fandrich et al. ............ 711/158 |
| 5,881,295 | A | 3/1999 | Iwata .......................... 710/262 |
| 6,141,700 | A | 10/2000 | Iwata ............................. 710/3 |
| 6,738,894 | B1 | 5/2004 | Iwata .......................... 712/200 |
| 2001/0050860 | A1 | 12/2001 | Kato et al. ............. 365/185.11 |

FOREIGN PATENT DOCUMENTS

JP  5-266219  10/1993

*Primary Examiner*—Kevin Verbrugge
(74) *Attorney, Agent, or Firm*—Miles & Stockbridge P.C.

(57) ABSTRACT

The present invention provides a microcomputer wherein in a system which needs to respond to events developed at intervals each shorter than an erase/program process time, erase/programming can be effected on an on-chip non-volatile memory as necessary during its processing. An erase and program control program for an electrically erasable and programmable non-volatile memory is configured inclusive of a loop of the application of a high voltage pulse and data verify or the like, for example. If a program jumped to a subroutine for an address specified by a user is programmed in advance during this loop, then a process by a CPU can be temporarily jumped to the subroutine for the user defined address. Thus, erase and programming can be effected on a system which needs to confirm internal and external events every predetermined intervals or a system with a learning function, or the like during the execution of a user program.

7 Claims, 25 Drawing Sheets

FIG. 4(A)

| OPERATION MODE<br>MAT | BOOT MODE | | | WRITER MODE | | |
|---|---|---|---|---|---|---|
| | ACCESS | PROGRAM | ERASE | ACCESS | PROGRAM | ERASE |
| USER MAT (Mmat) | ○ | ○ | ○ | ○ | ○ | ○ |
| USER BOOT MAT (Umat) | ○ | ○ | ○ | ○ | ○ | ○ |
| BOOT MAT (Tmat) | △ | × | × | △ | × | × |
| REPAIR & TRIMMING (Rmat) | × | × | × | × | × | × |

FIG. 4(B)

| OPERATION MODE<br>MAT | USER BOOT MODE | | | USER MODE | | |
|---|---|---|---|---|---|---|
| | ACCESS | PROGRAM | ERASE | ACCESS | PROGRAM | ERASE |
| USER MAT (Mmat) | ○ | ○ | ○ | ○ | ○ | ○ |
| USER BOOT MAT (Umat) | ○ | × | × | ○ | × | × |
| BOOT MAT (Tmat) | △ | × | × | △ | × | × |
| REPAIR & TRIMMING (Rmat) | × | × | × | × | × | × |

MICROCOMPUTER, PROGRAMMING METHOD AND ERASING METHOD

CROSS-REFERENCE TO RELATED APPLICATION

This application is a continuation of application Ser. No. 11/037,261 filed Jan. 19, 2005, now U.S. Pat. No. 7,194,571, which is a continuation of application Ser. No. 10/080,681 filed Feb. 25, 2002 (now abandoned).

BACKGROUND OF THE INVENTION

The present invention relates to a microcomputer having an electrically erasable and programmable non-volatile memory and a CPU (Central Processing Unit), and particularly to erase and program control on the non-volatile memory, e.g., a technology effective for application to a one-chip microcomputer having a flash memory.

An electrically erasable and programmable non-volatile memory such as a flash memory or the like stores information therein according to the difference between threshold voltages programmed to memory cells. In the flash memory, the difference between the threshold voltages is realized by the difference between the amounts of electrons or positive holes held by a floating gate. For example, a state of a threshold voltage high relatively with respect to a threshold voltage in a thermal equilibrium state is referred to as a program state, and a state of a threshold voltage low relatively therewith is called an erase state (the definition of the inverse is allowed). At this time, respective operations for erasing for bringing each memory cell into the erase state and programming for bringing each memory cell into the program state need to repeatedly perform the application of a high voltage pulse and verify of a threshold voltage state based on it.

A microcomputer with a flash memory being on-chipped includes a writer mode and a boot mode as operations modes for enabling the on-chip flash memory to execute erase and programming. The writer mode is an operation mode for making the microcomputer equivalent to a flash memory chip apparently and connecting it to a programming or writing device like an EPROM writer to thereby make it possible to carry out erasing and programming. The boot mode is an operation mode for establishing communications with a packaging system via a serial interface such as step synchronism or the like in a state of the microcomputer being packaged in a system to thereby make it possible to carry out erasing and programming. When a program and data are initially written into the on-chip flash memory before the system packaging, the writer mode is available. However, the reprogramming of information stored in an on-chip flash memory for upgrading a program and tuning data after the system packaging needs to utilize the boot mode. It is also possible to perform erasing and programming on board according to the execution of a user control program stored in a user area of a flash memory.

Incidentally, Unexamined Patent Publication No. Hei 5(1993)-266219 is known as an example of a reference in which the microcomputer equipped with the flash memory has been described.

SUMMARY OF THE INVENTION

In a flash memory on-chip type microcomputer which has heretofore been used, no control was returned to a user program until the completion of erasing and programming where a CPU was activated to effect erasing and programming on an on-chip flash memory.

However, according to discussions of the present inventors, assuming that the erase/program process for the flash memory takes at least 10 msecs, the CPU must control the erase/program process during that time. Further, it is not possible to allow the CPU to execute other processes. Therefore, the present inventors have found out that a system that needs to confirm the state of a terminal located per 1 msec, is not able to perform an erase/program process during execution of a user control program. In short, it has been found out by the present inventors that a system requiring a response to events developed at intervals shorter than an erase/program processing time also has the need for enabling erase/programming on a flash memory as necessary during its process. Incidentally, the terms of a user employed in the present specification means one utilizing a semiconductor device such as a microcomputer or the like in a broad sense. Thus, if a maker for manufacturing the semiconductor device makes use of the semiconductor device in one way or another, then the maker is even a user so far as it is concerned.

An object of the present invention is to provide a microcomputer wherein even in a system that needs to respond to events developed at intervals shorter than an erase/program process time, erase/programming can be effected on an on-chip non-volatile memory as necessary during a process thereof.

Another object of the present invention is to provide a programming method for allowing a central processing unit to execute a process other than a process for writing data and information into an electrically programmable non-volatile memory in the course of the process in a microcomputer having the central processing unit and the non-volatile memory.

A further object of the present invention is to provide an erasing method for allowing a central processing unit to execute a process other than a process for erasing data and information in an electrically erasable non-volatile memory in the course of the erasing process in a microcomputer having the central processing unit and the non-volatile memory.

The above, other objects and novel features of the present invention will become apparent from the description of the present specification and the accompanying drawings.

Summaries of typical ones of the inventions disclosed in the present application will be described in brief as follows:

[1] An erase and program control program for an electrically erasable and programmable non-volatile memory is set up inclusive of loops such as the application of a high voltage pulse and data verify or the like. If a program jumped to a subroutine for an address specified by a user is programmed into the loops in advance, it is then able to jump to a user branch, i.e., the subroutine at the address specified by the user. If a return instruction from the subroutine is executed after the execution of the subroutine, then the program returns to the original process routine. It is therefore possible to continuously carry out an erase and programming process halfway.

The following operations and effects are obtained from the above. (1) The erase and program control program is stored in a boot mat, for example. A branch address (jump-destined address) specified by a user is not described in the program. If the user passes the jump-destined address as an argument when the program is executed, then the program can jump to a desired branch-destined address by referring to the address according to a jump subroutine instruction.

Even during programming, control can be returned to a user control program at certain predetermined intervals. Further, since this is executed on a software basis, the intervals at which it is returned to the user's control, can also be changed by software. The jump destination is allowed even if taken in any areas of a built-in RAM or a non-volatile memory free of the execution of erase and programming. (2) Owing to the returning of the control to the user control program at the predetermined intervals even during the erase and programming, the erase and programming can be executed even without long-time deactivation of a system using the microcomputer. Accordingly, the erase and programming can be executed on a system that needs to confirm internal and external events or a system or the like with a learning function every predetermined intervals during execution of a user program.

[2] A microcomputer according to a more detailed aspect of the present invention includes an erasable and programmable non-volatile memory, and a CPU. The CPU is capable of temporarily branching to a process indicated by information set to first register means (FUBRA) for each cycle of a unit process including the application of an erase voltage for an erase operation or a program voltage for a programming operation, and a verify operation, or every plural cycles. The first register means is capable of programmably setting information thereto. The first register means is one of general purpose registers of the CPU, for example. The branching by the set value of the first register means may be, for example, either a method for performing branching by directly referring to the first register means according to a jump subroutine instruction, or a method for pre-executing an initialization process for embedding a jump-destined code into a jump subroutine instruction, based on the set value of the first register means and thereafter executing its program. The former method may be used where a compiler for an erase and program control program thereof is able to refer to the first register means within a limited range of the number of general purpose registers available as an argument within one function. This is because if not so, then the set value of the first register means is stacked and time is taken to execute a procedure for utilizing the corresponding register. In order to avoid it, the latter method may be adopted. When a program argument is passed using an assembler, the easiness of creation of the program is lost.

Even in the case of the microcomputer according to this aspect, the operations and effects described in the paragraphs (1) and (2) can be obtained.

The CPU skips the branching process when the information written into the first register means is a predetermined value. It is also easy to perform control on execution and non-execution of the branch. Further, control for changing a branching interval is also easy.

There is provided second register means (FKEY) readable and writable by the CPU. The non-volatile memory sets the setting of a first set value to the second register means as a necessary condition for enabling erase and programming operations. At this time, the CPU may set a value other than the first set value to the second register means upon the branch and set the first set value to the second register means for each return from the branch. This is done in consideration of a runaway of a program at a user branch destination. Namely, when program enable is taken due to the runaway of the CPU in a transferred state of the erase and program control program, the possibility that the information stored in the flash memory will be destroyed, still remains. In order to reduce the possibility of such undesired destruction even in small quantities, attempt should be taken so as not to meet a necessary condition for taking into consideration the runaway at the user branch destination, and changing the value of the second register means before a user branch executed during an erase and program flow, thereby enabling the erase and programming operations. Even in the event that the CPU runs away owing to the execution of the above, no erase and programming operations are started unless reprogramming of the second register means is done.

The value other than the first set value may be code information indicative of the progress of an erase and program process. In short, the code information corresponding to the progress thereof is added to a user branch between respective process cycles for erase and programming. Thus, when the routine processing is returned from a subroutine by mistake due to the runaway of the CPU or the like, the code information is useful in a check for a malfunction of its operation.

Assuming that no interrupts and exception handling are accepted during the erase and program process, it is not possible to cope with events that need an emergent process. Further, there is a possibility that an unrecoverable abnormal condition will occur in a system. When all the interrupts are accepted in reverse, the efficiency of the erase and program process is considerably degraded. In order to cope with it, the setting of masking an interrupt lower in interrupt priority level than a non-maskable interrupt may preferably be carried out when erase and programming are effected on an interrupt control circuit for inputting an interrupt request signal therein, and performing arbitration of interrupt requests which compete with one another, and an interrupt priority level-based interrupt mask process to thereby output an interrupt signal to the CPU.

When the erase and programming are executed, the CPU may perform a process for changing the location of an interrupt process routine for a non-maskable interrupt request to an address of a RAM. For example, a vector base register is changed to an address in a RAM area or the use of a dedicated vector register is set. This is because since information stored in an area being in the course of the erase and programming is still imperfect in its writing, the execution of a subroutine cannot be assured.

[3] A microcomputer according to another aspect of the present invention includes an erasable and programmable non-volatile memory, and a CPU. The non-volatile memory has an erase and program control program executed by the CPU and used for erase/program-controlling the non-volatile memory. The erase and program control program allows a process of the CPU to temporarily branch to another branch for each cycle of a unit process including the application of an erase voltage for an erase operation or a program voltage for a programming operation and a verify operation, or every plural cycles. The CPU specifies another process referred to above according to a value set to first register means (FUBRA).

Let's consider an aspect intended to realize a user branch by embedding a branch-destined address into a jump subroutine instruction for the erase and program control program in the above. Attention is given to a change in program code (embedding of branch-destined address). In this case, a RAM is placed in an address space of the CPU, and the non-volatile memory is caused to hold a transfer control program for transferring the erase and program control program to the RAM. Further, the CPU may embed a parameter (branch-destined address) to the branchable other process into the erase and program control program transferred to the RAM to thereby execute the erase and program control program.

[4] A further aspect of the present invention is particularly based on the assumption that attention is paid to a program or write loop and a program time is longer than an erase time. A microcomputer according to this viewpoint includes a non-volatile memory including a plurality of electrically programmable memory cells, and a central processing unit capable of executing a program control program with respect to the non-volatile memory. The central processing unit is capable of temporarily branching to a process for a first control program different from the program control program during the execution of the program control program.

For example, when information is written into the specified memory cell of the electrically programmable plural memory cells, the program control program defines a process for executing a plurality of times of program process loops and writing the corresponding information into the specified memory cell. The process of the central processing unit is capable of branching to the first control program for each program process loop referred to above.

Described more specifically, the microcomputer further includes a first memory circuit (FUBRA) programmable by the central processing unit. When the first memory circuit is set to a first set value by the central processing unit, the process of the central processing unit continuously executes the program control program. When the first memory circuit is set to a second set value different from the first set value by the central processing unit, the process of the central processing unit is branched to the first control program for each program process loop referred to above.

[5] A still further aspect of the present invention is particularly based on the assumption that attention is given to an erase loop and an erase time is longer than a program time. A microcomputer according to this viewpoint includes a non-volatile memory including a plurality of electrically erasable memory cells, and a central processing unit capable of executing an erase control program with respect to the non-volatile memory. The central processing unit is capable of temporarily branching to a process for a first control program different from the erase control program during the execution of the erase control program.

For example, when information is erased from the specified memory cell of the electrically erasable plural memory cells, the erase control program defines a process for executing a plurality of times of erase process loops and thereby erasing the corresponding information for the specified memory cell. The process of the central processing unit is capable of branching to the first control program for each erase process loop referred to above.

Described more specifically, the microcomputer further includes a first memory circuit (FUBRA) programmable by the central processing unit. When the first memory circuit is set to a first set value by the central processing unit, the process of the central processing unit continuously executes the erase control program. When the first memory circuit is set to a second set value different from the first set value by the central processing unit, the process of the central processing unit is branched to the first control program for each erase process loop referred to above.

[6] A still further aspect of the present invention pays attention to a programming method. Namely, a programming method for causing a central processing unit included in a microcomputer having the central processing unit and an electrically programmable non-volatile memory to execute a program control program to thereby write information into the non-volatile memory includes a first step for supplying an address for a memory cell to be programmed in the non-volatile memory, a second step for supplying information to be programmed to the memory cell, and a third step for repeatedly writing the data to be programmed into the memory cell. The third step includes a voltage applying step for applying a program voltage to the memory cell, a verify step for confirming whether the data to be programmed has been written into the memory cell, a step for referring to a value of a predetermined register and transitioning a process of the central processing unit to a predetermined process corresponding to a predetermined value set to the register when the predetermined value is stored in the register, and a step for returning the process of the central processing unit from the predetermined process to the third step.

A still further aspect of the present invention pays attention to an erasing method. Namely, an erasing method for causing a central processing unit included in a microcomputer having the central processing unit and an electrically erasable non-volatile memory to execute an erase program to thereby erase information stored in a predetermined memory cell of the non-volatile memory includes a first step for supplying an address for a memory cell to be erased in the non-volatile memory, and a second step for erasing the information from the memory cell. The second step includes a voltage applying step for applying an erase voltage to the memory cell, a verify step for confirming whether the information has been erased from the memory cell, a step for referring to a value of a predetermined register and transitioning a process of the central processing unit to a predetermined process corresponding to a predetermined value set to the register when the predetermined value is stored in the register, and a step for returning the process of the central processing unit from the predetermined process to the second step.

A still further aspect of the present invention pays attentions to an on-board programming method. Namely, a programming method for mounting a microcomputer having a central processing unit and an electrically programmable non-volatile memory to a substrate and thereafter causing the central processing unit to execute a program control program to thereby write information into a predetermined memory cell of the non-volatile memory includes a first step for supplying an address for a memory cell to be programmed in the non-volatile memory, a second step for supplying information to be programmed to the memory cell, and a third step for repeatedly writing the data to be programmed into the memory cell. The third step includes a voltage applying step for applying a program voltage to the memory cell, a verify step for confirming whether the data to be programmed has been written into the memory cell, a step for causing the process of the central processing unit to transit to a predetermined process, and a step for returning the process of the central processing unit from the predetermined process to the third step.

A still further aspect of the present invention pays attention to an on-board erasing method. Namely, an erasing method for mounting a microcomputer having a central processing unit and an electrically erasable non-volatile memory to a substrate and thereafter causing the central processing unit to execute an erase program to thereby erase information stored in a predetermined memory cell of the non-volatile memory includes a first step for supplying an address for a memory cell to be erased in the non-volatile memory, and a second step for erasing the information from the memory cell. The second step includes a voltage applying step for applying an erase voltage to the memory cell, a verify step for confirming whether the information has been erased from the memory cell, a step for causing the process of the central processing unit to transit to a predetermined process, and a step for returning the process of the central processing unit from the predetermined process to the second step.

According to these methods, on the way to a process for writing or erasing data and information into or from an electrically programmable non-volatile memory in a microcomputer having a central processing unit and the electrically programmable non-volatile memory, the central processing unit is allowed to execute a process other than the writing or programming process.

BRIEF DESCRIPTION OF THE DRAWINGS

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

FIG. 4 is an explanatory diagram illustrating by an example, access forms in respective operation modes set every memory mats of the flash memory;

DETAILED DESCRIPTION OF THE INVENTION

<<Microcomputer>>

Figure 1:
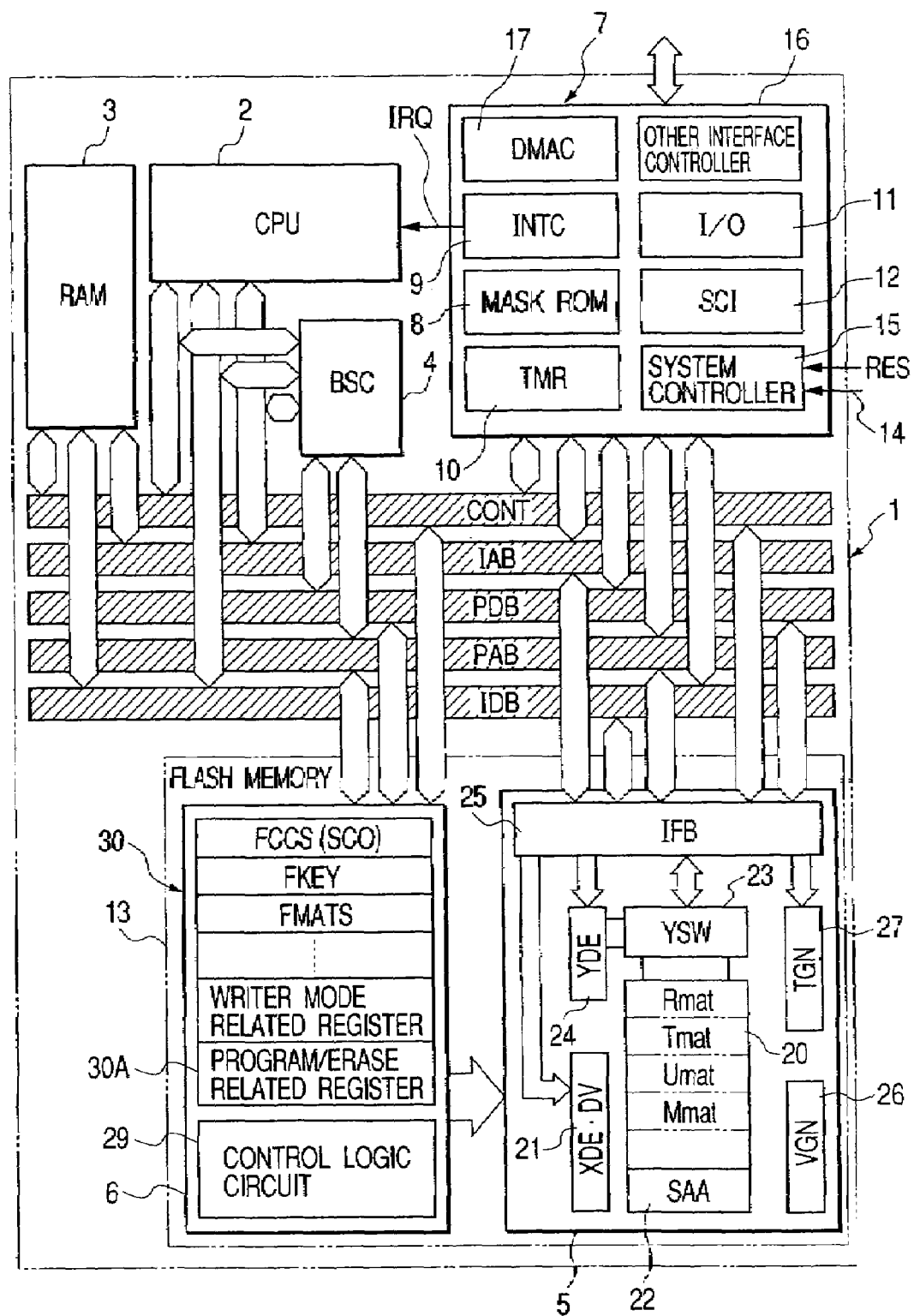
FIG. 1 is a block diagram of a microcomputer according to one embodiment of the present invention.

A microcomputer used as a data processor according to one embodiment of the present invention is shown in FIG. 1. Although not restricted in particular, the microcomputer 1 shown in the same drawing is formed on a single semiconductor substrate (semiconductor chip) like monocrystal silicon by a CMOS integrated circuit manufacturing technology.

The microcomputer 1 has a central processing unit (CPU) 2 used as an arithmetic control device, a RAM 3 used as a non-volatile memory, a bus state controller (BSC) 4, a flash memory 13, and other module 7 generically referred to as other built-in circuits. The flash memory 13 is one example of an electrically reprogrammable non-volatile memory, which comprises a flash memory module 5 and a flash control module 6. The other module 7 includes a mask ROM 8, an interrupt controller (INTC) 9, a timer (TMR) 10, an input/output port (I/O) 11, a serial interface controller (SCI) 12, other interface controller 16, a DMAC (Direct Memory Access Controller) 17 and a system controller 15 or the like. Those circuit modules are interfaced via buses IAB, IDB, PAB, PDB and CONT.

The buses IAB and IDB are respectively an internal address bus and an internal data bus relatively fast in information transmission rate. The buses PAB and PDB are respectively a peripheral address bus and a peripheral data bus relatively slow in information transmission rate. Control signal lines for transferring bus commands, bus access control signals and timing control signals or the like are collectively referred to as the bus CONT. The BSC 4 optimally controls access operation timing or the like with respect to the difference in operating speed between each of the internal buses IDB and IAB and each of the peripheral buses PDB and PAB or with respect to the difference in access form inherent in an access object. Further, the BSC 4 also performs chip selection or module selection control or the like corresponding to an access address.

A mode signal 14 of plural bits and a reset signal RES or the like are externally inputted to the system controller 15. When the reset signal RES is brought to a low level with power-on reset or hardware reset of the microcomputer 1, a rest operation is carried out inside the microcomputer 1 during its low level period. After the release of the reset according to the reset signal RES, the corresponding operation mode for the microcomputer 1 is determined according to the state of the mode signal 14 of the plural bits. The CPU 2 reads a reset vector in a program area corresponding to the operation mode, fetches an instruction for its address, decodes the fetched instruction, and starts an instruction execution.

The RAM 3 is used even as a work area for the CPU 2 or an area for temporarily storing data or a program. The mask ROM 8 is defined as a storage area such as a data table. The flash memory module 5 is defined as an area for storing a program and data for the CPU 2.

The interrupt controller 9 receives therein an interrupt request supplied from the outside of the microcomputer 1 or an interrupt request generated from a built-in circuit module according to the state of the interior of the microcomputer 1. Further, the interrupt controller 9 performs arbitration of interrupt requests which compete with one another and a priority level-based interrupt mask process according to interrupt priority levels and interrupt masks or the like. According to the results of the interrupt request arbitration and the interrupt mask process, the interrupt controller 9 supplies an interrupt signal IRQ to the CPU 2 and gives an interrupt vector address corresponding to an interrupt factor for the accepted interrupt request to the CPU 2. The CPU 2 causes processing to branch to a program instructed by the interrupt vector address. The interrupt controller 9 is supplied with interrupt mask data (IMSK) from the CPU 2 and masks the reception of an interrupt request lower than an interrupt priority level indicated by the interrupt mask data (IMSK).

The I/O 11 is used for connection to an external address bus and an external data bus, external interface with the SCI 12, the input of an external event signal to the TMR 10, external interface to the interface controller 16, etc. The interface controller 16 can be applied to interfaces such as an ATAPI or an SCSI or the like.

Figure 2:
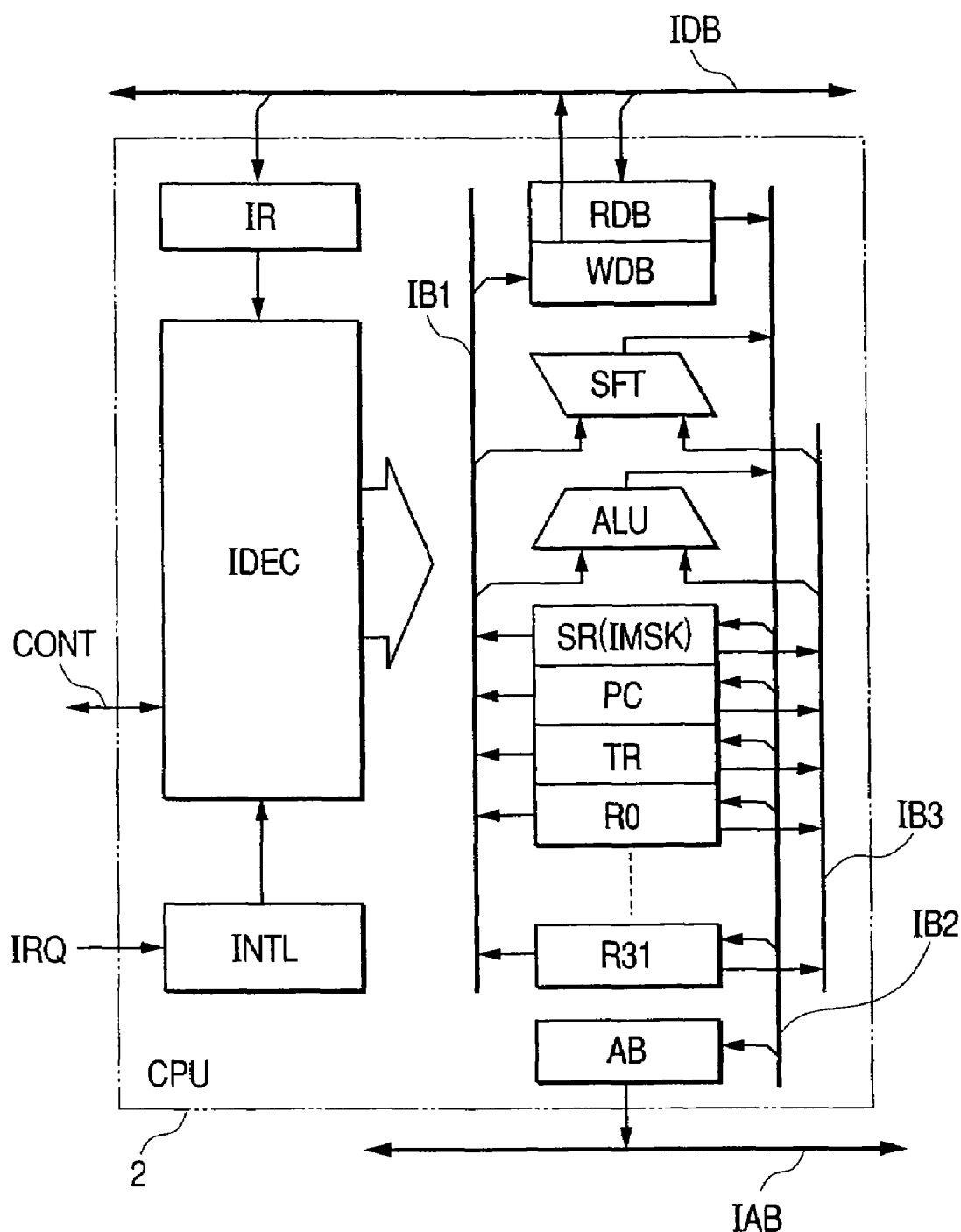
FIG. 2 is a block diagram showing a specific example of a CPU2.

A specific example of the CPU 2 is shown in FIG. 2. Although not restricted in particular, the CPU 2 includes, at an execution section, computing units such as a shifter SFT and an arithmetic logic unit ALU or the like, a register group such as 32-bit general purpose registers R0 through R31, a program counter PC, a status register SR and a temporary register TR or the like, and buffer circuits such as a read data buffer RDB, a write data buffer WDB and an address buffer AB or the like. They are connected to a predetermined internal bus of first through third internal buses IB1 through IB3. The CPU 2 includes an instruction register IR, an instruction decoder IDEC and an instruction sequence logic INTL as an instruction control section.

The read data buffer RDB supplies data inputted from, for example, a 32-bit data bus IDB to the internal bus IB2. The status register SR has a field for interrupt mask data IMSK. The interrupt mask data IMSK is supplied to the interrupt controller 9. The interrupt controller 9 masks an interrupt request lower than an interrupt priority level indicated by the interrupt mask data IMSK.

The program counter PC has an instruction address to be next executed. When the instruction address is outputted from the address buffer AB to the internal address bus IAB, an instruction read from its corresponding address of the RAM 3 or the like is fetched into the instruction register IR via the internal data bus IDB. The instruction decoder IDEC-decodes the instruction fetched into the instruction register IR to generate a control signal in the CPU 2, thereby controlling arithmetic processing done by the execution section. The instruction sequence logic INTL performs control for changing an instruction execution sequence in response to the interrupt signal IRQ or the like.

In FIG. 1, the flash memory module 5 includes a memory cell array 20, an X decoder-driver (XDE•DV) 21, a sense amplifier array (SAA) 22, a Y switch array (YSW) 23, a Y decoder (YDE) 24, an input/output circuit (IFB) 25, a power circuit or voltage generator (VGN) 26, and a timing generator (TGN) 27. The memory cell array 20 has flash memory cells (not shown) disposed in matrix form. Although not restricted in particular, each of the flash memory cell includes a source and a drain on a semiconductor substrate or a well region and has a stacked structure formed with a floating gate and a control gate above a channel with an insulating film interposed therebetween. Each of the flash memory cells is configured such that the source is electrically connected to its corresponding source line, the drain is electrically connected to its corresponding bit line and the control gate is electrically connected to its corresponding word line.

Each of the flash memory cells has a threshold voltage made programmable and holds information according to the programmed threshold voltage. When one flash memory cell retains one-bit information, for example, a relatively high threshold voltage state is called a program state whereas a relatively low threshold voltage state is called an erase state. Although a program operation for acquiring the program state is not restricted in particular, 10V is applied to the control gate, 5V, for example, is applied to the drain, and 0V, for example, is applied to the source and the substrate to allow a current to flow between the drain and source, whereby the injection of hot electrons occurs. Thus, electrons are stored in the floating gate and hence the threshold voltage of the memory cell increases. Although an erase operation for acquiring the erase state is not restricted in particular, 10V is applied to the control gate, −10V, for example, is applied to the source and the substrate, and the drain is rendered open (floating), for example, to thereby emit electrons stored in the floating gate into the substrate, whereby the threshold voltage of the memory cell is lowered.

The input/output circuit 25 inputs addresses, control signals and commands among the buses IAB, IDB, PAB, PDB and CONT and performs the input/output of data. Address signals inputted to the input/output circuit 25 are inputted to the XDEC•DV 21 and YDE 24, where they are respectively decoded. The XDEC•DV 21 selects a corresponding word line according to the result of decoding thereof. The YDE 24 selects a corresponding bit line through the YSW 23 according to the result of decoding thereof. The corresponding flash memory cell is selected according to the word-line selection and the bit-line selection. Upon a read operation, data read from the selected flash memory cell is detected by the SAA 22, which in turn is outputted to the bus PDB or IDB via the input/output circuit 25. Upon the program operation, program data supplied to the input/output circuit 25 from the bus PDB or IDB is latched in a program latch circuit lying within the input/output circuit 25. Programming•program inhibition is controlled according to the latched data with respect to each memory cell subjected to the word-line selection. Prior to program processing, erasure is effected on each flash memory cell in block units before the program processing.

The power circuit 26 has a clamp circuit, a charge pump circuit, etc. and supplies various voltages used for operations such as programming, erase, reading effected on the flash memory. The timing generator 27 performs controls for interface with the outside of the flash memory, based on a strobe signal supplied via the control bus CONT and commands inputted via the data buses PDB and IDB.

In FIG. 1, the flash control module 6 includes program transfer related various registers 30 for effecting programming and erasing on the flash memory module 5, and a control logic circuit 29. An FCCS, an FKEY, FMATS, a writer mode related register, and a program/erase related register are typically illustrated in FIG. 1 as control registers. A storage area of the RAM 3 and the general purpose registers of the CPU 2 are also available for the control of the program/erase operations on the flash memory module 5.

<<Memory Mats of Flash Memory>>

Figure 3:
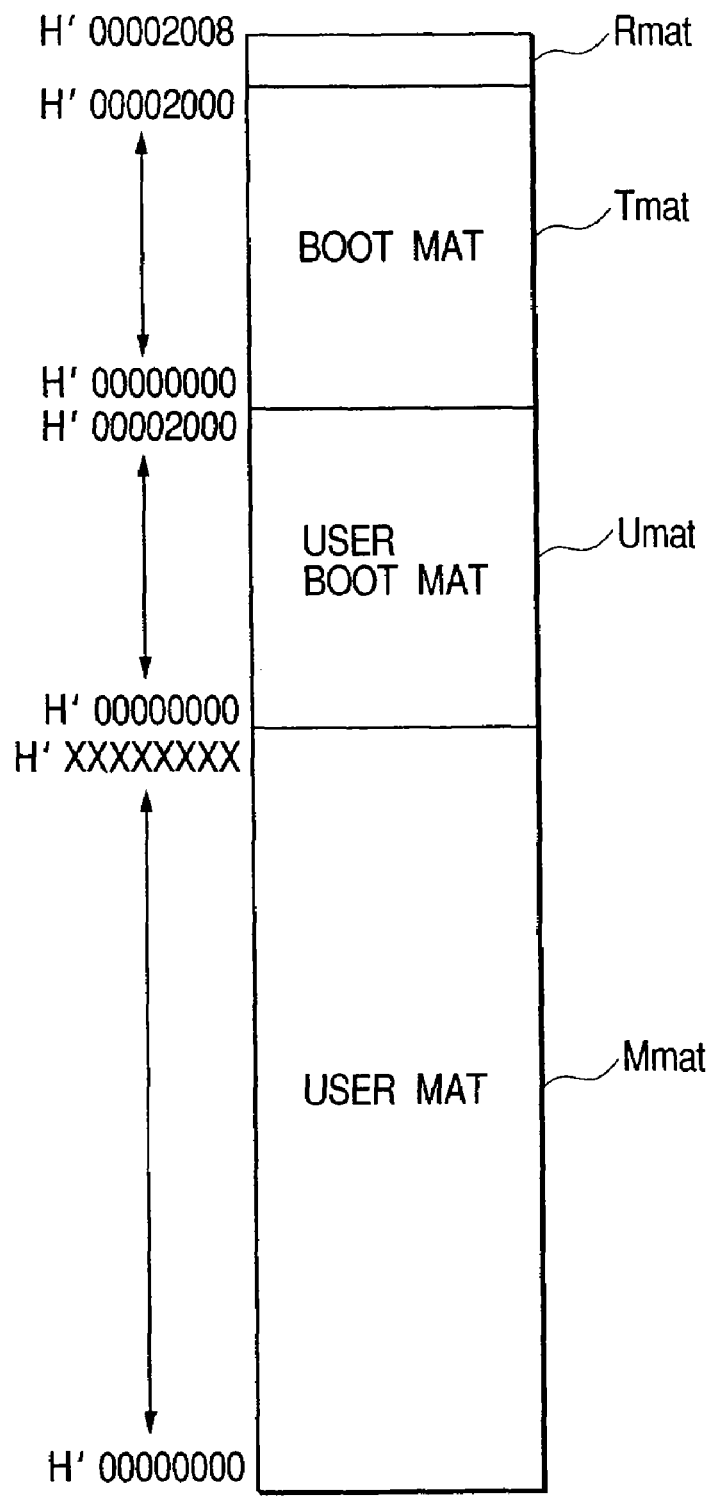
FIG. 3 is an explanatory diagram illustrating a memory mat of a flash memory by way of example.

Memory mats of a flash memory are illustrated in FIG. 3 by way of example. The memory cell array 20 of the flash memory module 5 includes an electrically erasable and programmable boot mat (first area) Tmat, a user boot mat (second area) Umat, a user mat (third area) Mmat, and a repair and trimming mat Rmat. The boot mat Tmat, the user boot mat Umat and the user mat Mmat are respectively assigned memory spaces with a 0 address (H' 0000000) indicative of a leading or start address in an address space of the CPU 2 as a start address. In short, the boot mat Tmat, the user boot mat Umat and the user mat Mmat are configured so that their address spaces overlap each other. The address decoder YDEC and XDEC•DV select address decode logic in response to an instruction indicative of which mat should be utilized. Which mat should be used, depends on the operation modes or the like of the microcomputer, which is instructed by the mode signal 14. The repair and trimming mat Rmat stores therein defect relief addresses in the memory cell array, and setting data for a trimming circuit for carrying out an alignment fit corresponding to each circuit characteristic.

<<Operation Modes>>

In a flash memory, program-related and erase-related programs are becoming complex with advances in process generation. Assuming that a user must create erase/program control programs under such circumstances, the user becomes a large burden. The microcomputer 1 has been taken into consideration in such a manner that the erase/programming program creating burden on the user can be reduced and the erase/program can be executed in any modes with simple procedures. Particularly when each of parameters such as a high voltage pulse applying time required to effect erase/programming on the flash memory 13 is tuned up or a processing flow is changed, operation modes are prepared which are capable of being implemented using software without depending on hardware and enable the implementation of erase/programming with simple procedures without imposing a burden on a user. The contents thereof will be described in brief. Reference can be made to the erase/program control program held in the boot mat Tmat in any operation modes. Further, since a portion about security is also described in the program of the boot mat Tmat, the user is able to use the program in an inconvenience-free range.

The operations modes of the microcomputer 1 will be described in detail. When attention is given to erase/programming for the flash memory 13, the microcomputer 1 has a writer mode, a boot mode (first mode), a user boot mode (second mode) and a user mode (third mode). Although not restricted in particular, the mode signal 14 is of two bits, and the system controller 15 decodes a combination of its logical values and judges whether the specified operation mode corresponds to any of the writer mode, the boot mode, the user boot mode and the user mode.

The writer mode is an operation mode which enables the execution of the erase/programming for the flash memory 13 by use of a programming device like an EPROM writer. When the writer mode is specified, the CPU 2 effects vector fetch from a leading or start address of the boot mat Tmat after reset processing and starts execution of a program (start up from the boot mat). Further, the CPU 2 transfers all of a command decision program and erase/program related programs to the RAM 3. Thereafter, the CPU 2 proceeds to the execution of the programs transferred to the RAM 3, and the flash memory 13 is capable of performing erase/programming by the EPROM writer. The writer mode is suitable for storing an arbitrary user control program or the like into the user mat Mmat and user boot mat Umat off board (in a state in which the microcomputer is not implemented or mounted on a system board).

The boot mode is an operation mode which is capable of effecting erasing on all of the mats Tmat, Umat and Mmat and enables execution of programming through the use of the SCI 12. The boot mode allows the CPU 2 to process the program of the boot mat Tmat and disables the CPU 2 to effect erase and programming on the boot mat Tmat. Described specifically, when the boot mode is specified, the CPU 2 effects vector fetch from a start or leading address of the boot mat Tmat after reset processing and starts execution of a program. Further, the CPU 2 transfers the erase/program related program and the command decision program in the boot mat Tmat to the RAM 3 as a process necessary for the boot mode. After the completion of the transfer thereof and the termination of other processes, the CPU 2 proceeds to the execution of the programs on the RAM 3. After the erasing is effected on all of the mats Umat and Mmat by the execution of the programs on the RAM 3, the command decision program is started up and programming is enabled through the use of the SCI 12. The boot mode is suitable for storing an arbitrary user control program, etc. into the user mat Mmat and user boot mat Umat at an on-board equipped with a serial communication interface.

The user boot mode is an operation mode which allows the CPU 2 to process the corresponding program of the user boot mat Umat to thereby enable execution of erase and programming using a user-based interface, and disables erasure and programming for the boot mat Tmat and user boot mat Umat. Described specifically, the user boot mode starts from the boot mat Tmat. The CPU 2 executes the program lying within the boot mat Tmat and transfers a user boot mat change program to the RAM 3. Afterwards, the CPU 2 is shifted to the execution of the corresponding program on the RAM 3. With the execution of the program on the RAM 3 by the CPU 2, the mat on the flash memory 13 as seen in the address space of the CPU 2 is changed from a default user mat Mmat to a user boot mat Umat and jumped over to its area after the vector address of the user boot mat Umat has been read. When security is provided, a jump is carried out after the erasing of the user mat Mmat has been carried out. Upon execution of programming, a necessary erase/programming program is downloaded from the boot mat Tmat to the RAM 3 through the use of an SCO mode to be described later. Thereafter, the erase/program control program is used to effect programming on the user mat Mmat. In short, a user-dedicated interface program is prepared for the user boot mat Umat, and program data transfer matched with a mounting board of a user can be implemented. The user boot mode is suitable for writing a user control program or the like into the user mat Mmat through the use of an onboard interface included in the system board of the user. The erasure of the user boot mat Umat is inhibited in this operation. Thus, even if the system board of the user is not provided with a serial interface and the boot mode is unavailable on board, programming made via an onboard interface included in the system board of the user as an alternative to it can be secured.

The user mode is an operation mode which enables execution of erasure and programming through the use of the corresponding program held in the user mat Mmat and disables erasure and programming for the boot mat Tmat and user boot mat Umat. Described in details, the CPU 2 is started up from the user mat Mmat to execute the program on the user mat Mmat. Particularly when an SCO bit to be described later is enabled when required by a user, the boot mat Tmat and the user mat Mmat are automatically switched, so that the program is started from a given address on the boot mat Tmat, whereby the erase/program control program on the boot mat Tmat is transferred to the RAM 3. After the transfer of the program has been completed, the user mat Mmat and the boot mat Tmat are automatically switched to provide a return to user's processing. Thus, the erase/program control program is utilized according to the user program, thereby enabling erasure and programming with respect tot the user mat Mmat. In short, in the user program mode, the erase/program control program on the boot mat Tmat is transferred onto the RAM 3 through the use of an SCO mode to be described later, thereby enabling the utilization of such a program. The user mode is suitable for reprogramming parameters on the user mat Mmat on board during the execution of the user control program.

Access forms based on the respective operation modes of the respective mats are illustrated in FIGS. 4(A) and 4(B). The access forms shown in the same drawing are those obtained by putting in order the access forms described in the above operation modes. As is apparent from the same drawing, the repair and trimming mat Rmat and the boot mat Tmat are disabled for erasure and programming in any operation modes. The user boot mat Umat is enabled for erasure and programming in the user boot mode and the user mode (user program mode) that enable execution of the user control program. The user boot mode is suitable for writing a user control program or the like into the user mat Mmat through the use of an onboard interface included in the system board of the user. Upon this operation, the erasure of the user boot mat Umat is inhibited. Thus, even if the user's system board is not provided with a serial interface and the boot mode is not available on board, programming made via the onboard interface included in the user's system board can be assured as an alternative to it. Incidentally, in FIG. 4, the access means a read access, symbol Δ means that the read access can be carried out according to a program stored in the boot mat and does not means that the read access can be arbitrarily performed according to the user control program.

Figure 5:
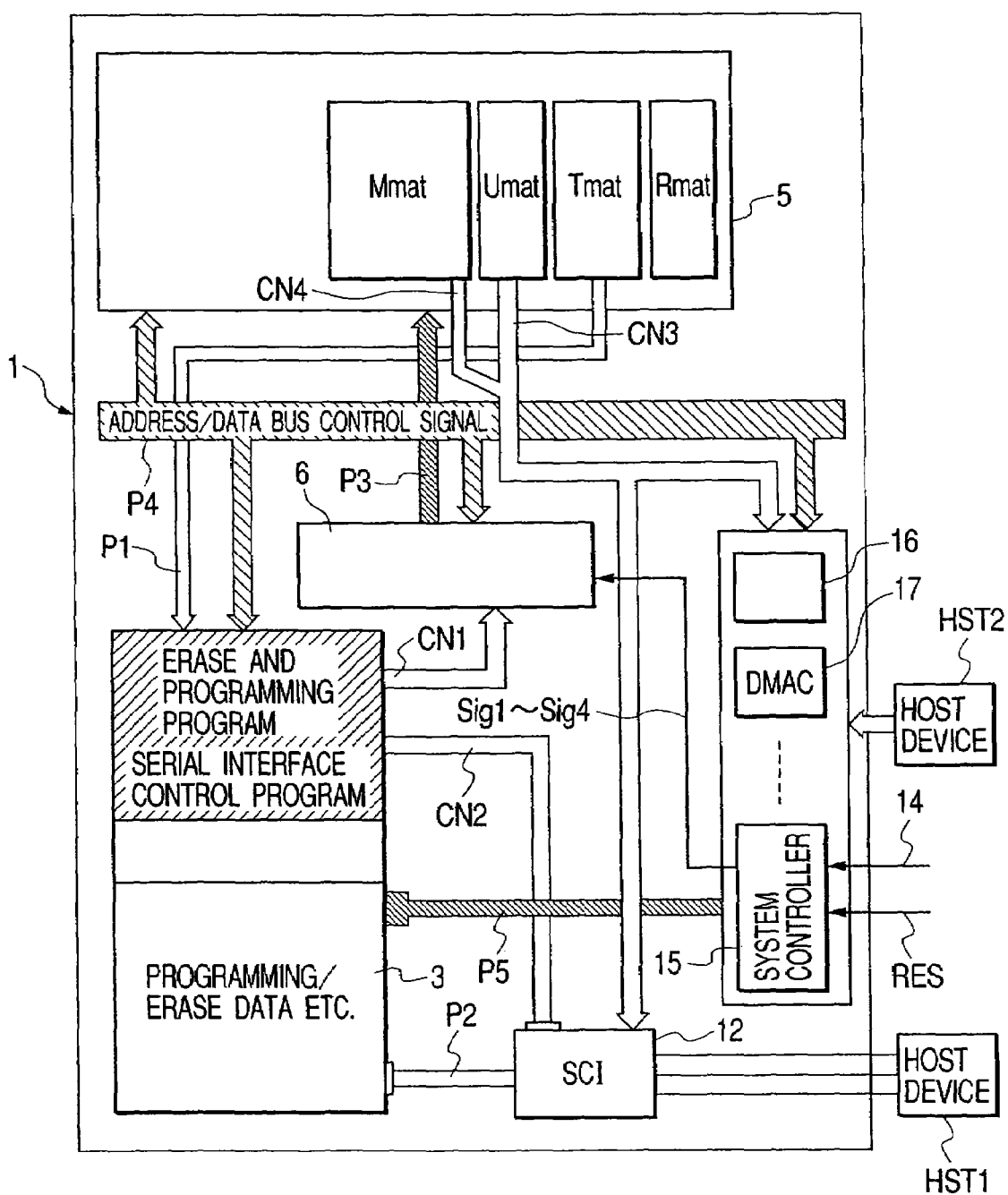
FIG. 5 is an explanatory diagram typically showing locations of programs executed by a CPU and operations made by their execution.

FIG. 5 typically shows the location of a program executed by a CPU and operation based on its execution. The illustration of the CPU2 is omitted in FIG. 5. CN1 virtually shows a control signal group of a result obtained by decoding an erase and program control program or the like transferred from the boot mat Tmat to the RAM 3 with the CPU 2. CN2 virtually shows a control signal group of a result obtained by decoding a serial interface control program transferred from the boot mat Tmat to the RAM 3 with the CPU 2. CN3 virtually shows a control signal group of a result obtained by decoding a user interface control program of the user boot mat Umat with the CPU 2. CN4 virtually shows a control signal group of a result obtained by decoding a user interface control program of the user mat Mmat with the CPU 2. While the control signals CN3 and CN4 are respectively illustrated so as to indicate the results of decoding of the programs fetched directly from the user boot mat Umat and user mat Mmat, they may be results of decoding of programs temporarily transferred to the RAM 3 and fetched therefrom. Sig1 through Sig4 mean the result of decoding of a mode signal 14 after the release of reset by the system controller 15. Sig1 means a boot mode, Sig2 means a user boot mode, Sig3 means a user mode, and Sig4 means a write mode, respectively. While those signals Sig1 through Sig4 are actually supplied even to the CPU 2, the illustration of their states is omitted herein.

When the boot mode is specified by the mode signal 14, the flash control module 6 transfers an erase and program control program and a serial communication control program or the like of the boot mat Tmat to the RAM 3 in response to the signal Sig1 (path P1). According to the result of decoding of the serial communication control program by the CPU 2 (CN2), program data is brought from a serial interface on board a host device HST1 to the RAM 3 (path P2). According to the result of decoding of the erase and program control program by the CPU 2 (CN1), the flash memory 13 is subjected to erasure, and a user control program is programmed into the user boot mat Umat and the user mat Mmat by use of the program data on the RAM 3 (paths P3 and P4).

When the user boot mode is specified by the mode signal 14, the flash control module 6 transfers a mat change control program or the like from the boot mat Tmat to the RAM 3 in response to the signal Sig2 (path P1), so that the boot mat is switched to the user boot mat Umat, where its leading vector is fetched and executed. Upon execution of programming, an erase and programming program is downloaded from the boot mat Tmat to the RAM 3. According to the result of decoding of the user interface control program held in the user boot mat Umat (CN3), program data is brought from a user interface on board a host device HST2 to the RAM 3 (path P5). According to the result of decoding of the erase and program control program by the CPU 2 (CN1), the flash memory 13 is subjected to erasure, and a user control program and user data are programmed into the user mat Mmat by use of the program data on the RAM 3 (paths P3 and P4). As the user interface, may be mentioned, for example, an ATAPI interface or the like realized by the other interface controller 16. Incidentally, the user interface control program stored in the user boot mat Umat may be a serial interface control program similar or different from one stored in the boot mat Tmat.

When the user mode is specified by the mode signal 14, it is transferred to the flash control module 6 in response to the signal Sig3. Upon execution of programming, an erase and programming program is downloaded from the boot mat Tmat to the RAM 3. According to the result of decoding of the user interface control program held in the user mat Mmat (CN4), program data is captured from the user interface on board the host HST2 to the RAM 3 (path P5). According to the result of decoding of the erase and program control program by the CPU 2, the flash memory 13 is subjected to erasure, and a user control program and user data are programmed into the user mat Mmat by use of the program data on the RAM 3 (paths P3 and P4). Incidentally, the user interface control program stored in the user mat Mmat may be a serial interface control program similar or different from one stored in the boot mat Tmat.

Now consider a microcomputer unequipped with a user boot mat Umat and a user boot mode as an example compared with the microcomputer 1 although not illustrated in the drawing in particular. If, in this case, a user interface program stored in the user boot mat Umat is stored in a user mat Mmat, then the microcomputer is capable of programming or reprogramming programs and data into the user mat Mmat via a user interface on board a host device HST2 in a manner similar to the microcomputer 1. As is the case in the microcomputer 1, however, the microcomputer has a possibility that the user interface program stored in the user mat Mmat will be erased from the relationship in which free reprogramming is allowed for the user mat Mmat. If the host device HST2 is not provided on board with a serial interface available in a boot mode when erased, then the microcomputer according to the comparative example is no longer capable of performing the input/output of information to and from the host device HST2.

According to the microcomputer 1 having the operation modes referred to above, the following operations and effects can be obtained. (1) Since the user boot mat Umat capable of storing therein the user-dedicated communication protocol is prepared, the arbitrary interface provided in the microcomputer 1 can be diverted to the erasure and programming of the flash memory 13. (2) Since it is possible to adopt the user-optional interface for the erasure and programming of the flash memory 13, the serial interface may not necessarily be prepared for the host device HST2. (3) Since the user boot mat Umat and the user mat Mmat are provided in parts, the user-optional program interface can be realized for the erasure and programming even if the dedicated communication protocol is not programmed into the user mat Mmat. Therefore, it becomes easy to create the control program used with being stored in the user mat Mmat. In short, no special consideration may be given to the prevention of erasure of the communication control program used in the user program mode. (4) Since the erasure and programming for the user boot mat Umat are disabled on a hardware basis in the user boot mode started up from the user boot mat Umat, the information stored in the user boot mat Umat is prevented from destruction due to a runaway or the like. Further, even if the CPU 2 has gone haywire upon debug, this does not lead to the destruction of the program for controlling the external interface. Therefore, the reprogramming of the user mat Mmat can be freely carried out on board even without detachment of the packaged microcomputer chip.

<<Erase and Program Protect>>

Figure 6:
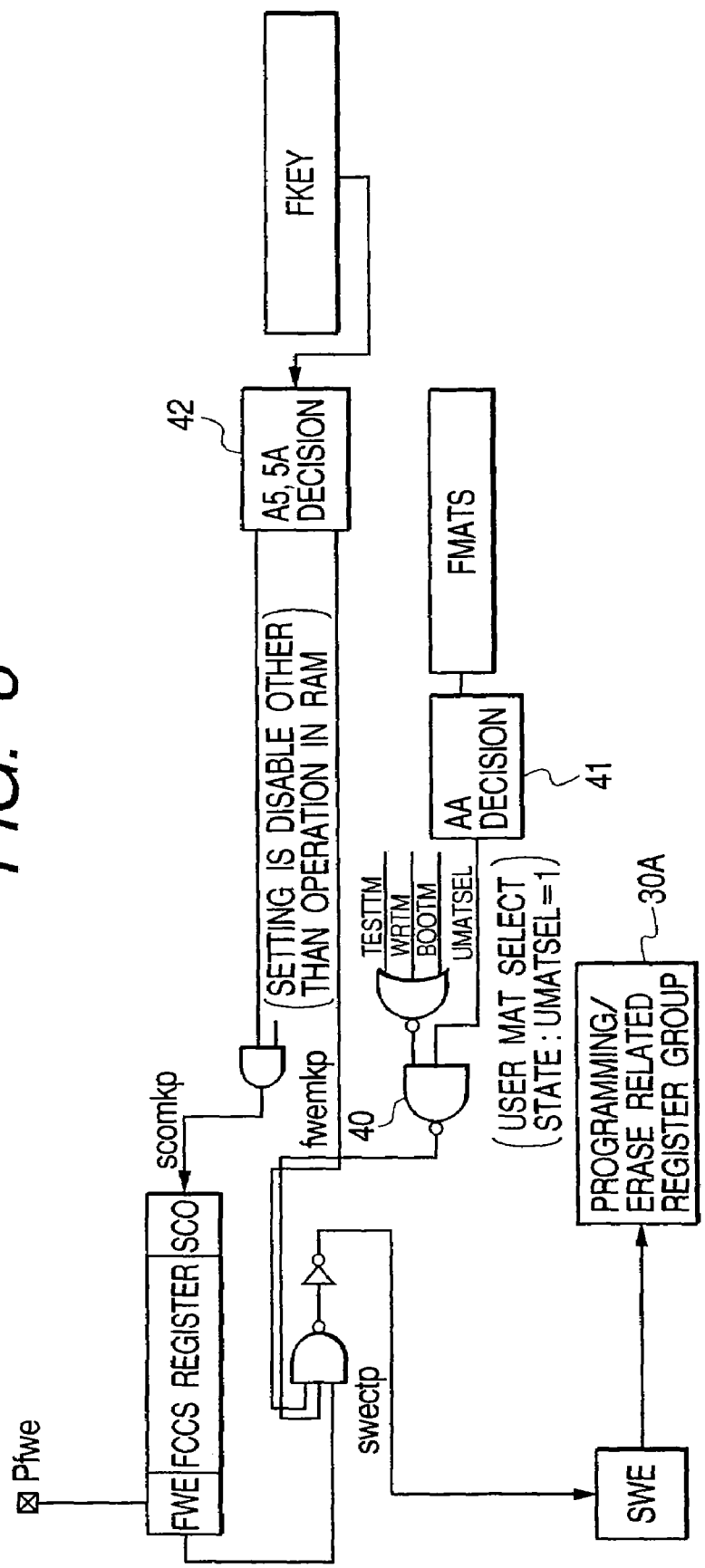
FIG. 6 is a logic circuit diagram illustrating by an example, a logic configuration for erase and program protection of the flash memory.

A logic configuration for protection against erasure and programming of the flash memory 13 is illustrated in FIG. 6 by way of example. The logic shown in the same drawing is defined as positive logic and the configuration thereof is implemented by the flash control module 6.

The operation of effecting erasure and programming on the flash memory is enabled by setting control data necessary for processing to an initial value of a programming/erase related register group 30A. The setting of the control data to the programming/erase related register group 30A is enabled when a control bit SWE is of a logical value "1". In short, unless the control bit SWE is set to the logical value "1", the erase and programming for the flash memory 13 is disabled.

A first condition for setting the control bit SWE to the logical value "1" is to set an enable bit FEW of a register FCCS to the logical value "1 through an external terminal Pfwe.

A second condition is to obtain a select state of an operation mode for setting the output of an NAND gate 40 to the logical value "1", and a mat select state of the flash memory. Namely, the operation mode is a test mode (TESTTM=1), a writer mode (WRTM=1) or a boot mode (BOOT=1). Alternatively, no user boot mat Umat is selected in a user mode or a user boot mode (UMATSEL=0). Incidentally, the test mode is of an operation mode used in a device test by a maker for manufacturing a microcomputer. While all the operations are enabled, such consideration that an operation mode non-open to a user, i.e., a user-based setting is disabled, has been given thereto.

Figure 7:
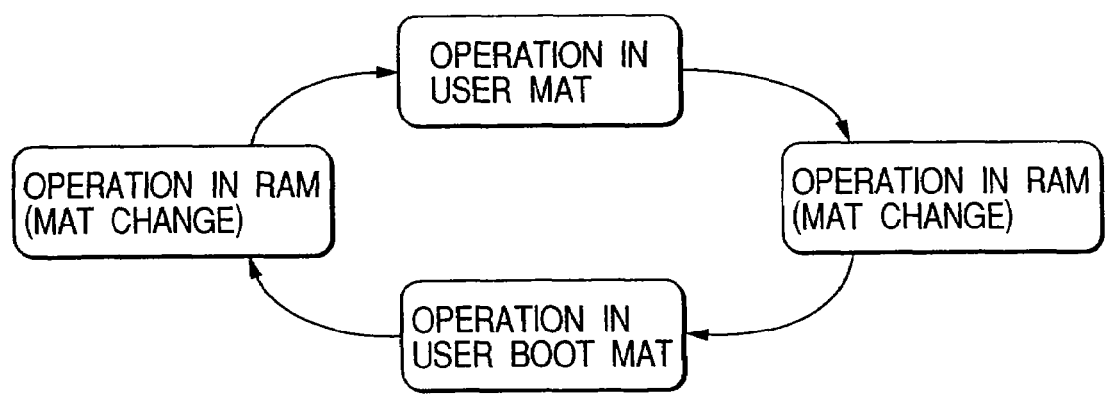
FIG. 7 is a state transition diagram at the time that CPU's operations are switched between a user mat and a user boot mat.

The signal UMATSEL is defined as a decision result for a register FMATS and an AA decision circuit 41 with respect to a set value of the register FMATS. The register FMATS is used to perform switching between the user mat Mmat and the user boot mat Umat. Using the register FMATS makes it possible to cause the operation of the CPU 2 to transit from the user mat Mmat to the user boot mat Umat. There are, however, items restricted to the mat change. Namely, a condition under which a user boot mat select bit for the register FMATS can be set, is that the operation of the CPU 2 is executing the program of the RAM 3. Under this condition, the BSC 4 detects and determines that an address area for instruction fetch made by the CPU 2 is an address area for the RAM 3. An initial value of the register FMATS is other than H'AA and indicates a user mat select state. The user mat select state is indicated by H'AA. A transition state at the time that the operation (OP) of the CPU 2 is switched between the user mat Mmat and the user boot mat Umat, is shown in FIG. 7.

Owing to the second condition, access to the user boot mat Umat is enabled in any modes. However, programming/erase is allowed only in the writer mode and boot mode (and test mode).

A third condition is that a register FKEY has been set to an erase and programming allowable value. The register FKEY is provided to prevent a runaway of a program due to a voltage drop and noise or the like and the destruction of the program due to it. The register FKEY is used in view of the case in which the program runs away after the erase and program control program (programming/erase program) has been transferred. Even if the CPU 2 gone haywire due to the terminal Pfwe and the control bit SWE, no programming/erase is executed basically. However, in order to further enhance reliability, the user sets the value of "5A" to the register FKEY before the execution of the programming/erase. When this "5A" is not stored therein, the control bit SWE cannot be set even if FWE is brought to enable ("1"). A state in which "5A" is being stored in the register FKEY, is detected by an A5, 5A decision circuit 42, where it is brought to a signal fwemkp=1, whereby SWE can be set to the logical value "1".

The register FKEY functions as a program transfer relation as well as functioning as the programming/erase program relation. Namely, in terms of the relationship in which an erase and program control program for a flash memory is stored in its corresponding boot mat Tmat and made available in a user boot mode and a user mode as well as in a boot mode, a control bit SCO is provided for the register FCCS and enabled to transfer the erase and program control program to the RAM 3. In doing so, the user mat Mmat is automatically changed to the boot mat Tmat so that the erase and program control program is transferred from the boot mat Tmat to the RAM 3, whereby a return instruction is executed after the completion of the processing to thereby make a return to the processing of the user. When, at this time, the program runs away at a location where the user does not desire to execute programming/erase, and the programming/erase program is transferred, there is a high possibility that a user program will be destroyed. In order to avoid it, the register FKEY is used. The user stores "A5" in the register FKEY before the control bit SCO is set. When no "A5" is stored therein, the control bit SCO cannot be set. Further, the operation of the program on the RAM 3 by the CPU 2 is also defined as a condition. When "A5" is stored therein and the operation of the CPU 2 is effected on the RAM 3, the SCO bit can be set, and the transfer of the erase and program control program from the boot mat Tmat to the RAM 3 is allowed.

As to the erase and programming effected on the flash memory 13 as described above, the register FKEY exclusively controls the transfer and erase/programming of each program. Therefore, when the program runs away in its non-transferred state, it is hard to execute programming/erase.

<<Program Mode Judge Process>>

Figure 8:
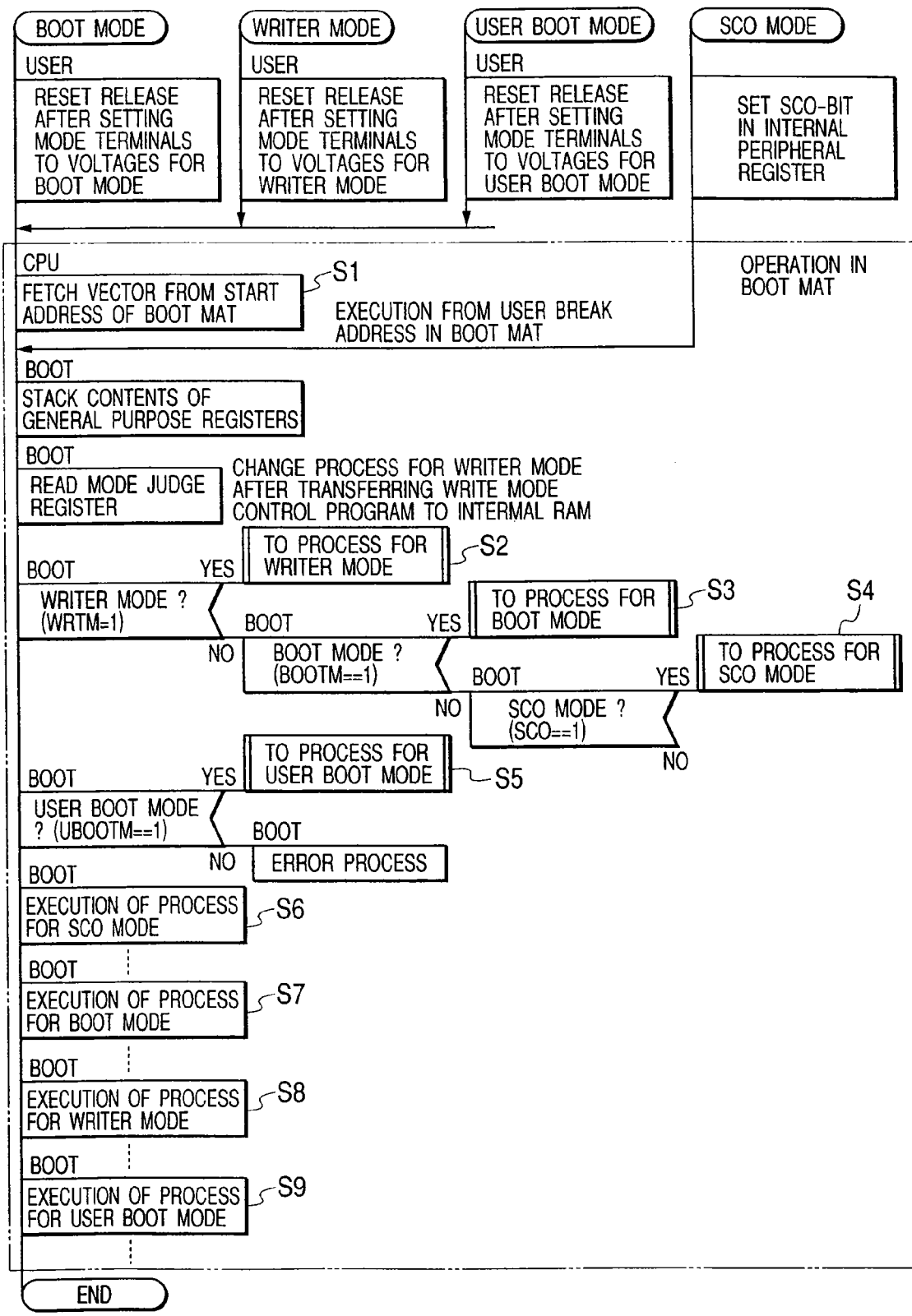
FIG. 8 is a flowchart for describing a program mode determining process.

Processes in the respective operation modes will now be described in detail. A flowchart 13 for describing a program mode decision or judge process is illustrated in FIG. 8 by way of example. An SCO mode means an operation mode used when erase and programming are effected on the flash memory in a user mode. As to a boot mode, a writer mode, a user boot mode and a user mode, their corresponding mode terminals are set and a reset release may be carried out after their setting. The SCO mode is set by setting the logical value "1" to the control bit SCO during the user mode. Mode information is set to its corresponding mode judge register according to the set operation mode.

When the operation mode is set, the CPU 2 executes a program in a boot mat (OP in boot mat). In the boot mode, writer mode and user boot mode, the CPU 2 fetches a vector from a start address in the boot mat to start program execution (S1). In the case of the SCO mode, however, a process is started from a predetermined address other than the start address in the boot mat, e.g., a user break address corresponding to exception handling highest in priority.

When the process start is made, the CPU 2 reads the mode judge register (S2) and judges the contents thereof. Further, the CPU 2 executes necessary pre-processes such as the transfer of an ease and program control program, etc. (S2 through S5) and proceeds to corresponding processes (S6 through S9). Incidentally, the term of "user" shown in each process column of the flowchart means that its process is a process executed based on a program defined by a user. The term of "boot" shown in each process column means that its process is a process executed based on a program in a boot mat Tmat.

<<Writer Mode Process>>

Figure 9:
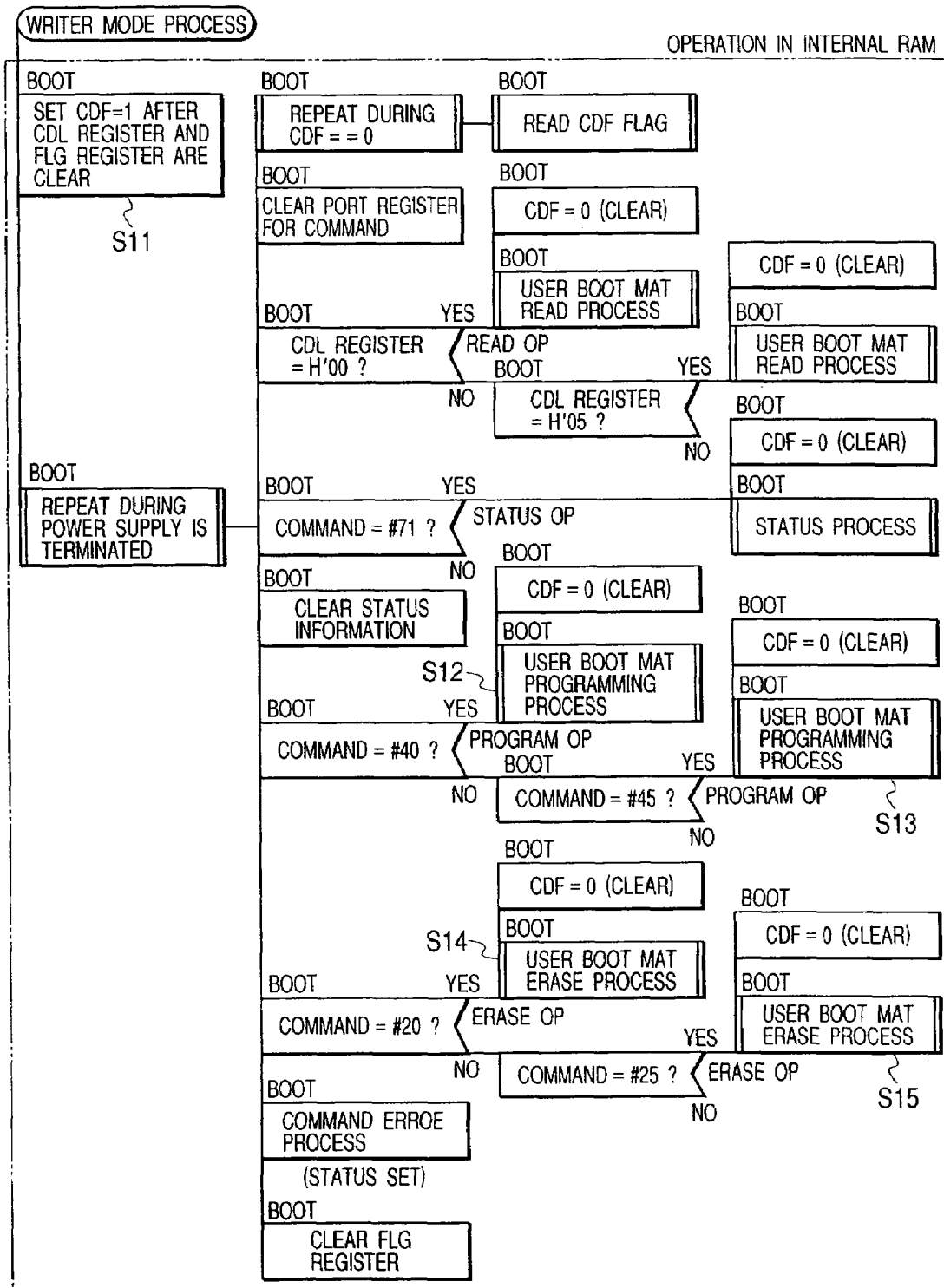
FIG. 9 is a flowchart for describing a writer mode process.

A flowchart for describing a writer mode process is illustrated in FIG. 9. When the writer mode is set, the writer mode control program is transferred to the RAM 3 as shown in FIG. 8. In the writer mode, a command/data register (CDL) used for erase and programming, and a flag register (FLG) are first cleared, and "1" is set to a command flag (CDF) (S11). Erasing (S14 and S15) and programming (S12 and S13) for a user mat Mmat and a user boot mat Umat are executed until a power supply is terminated, according to a command and program data set to the command/data register (CDL) from an EPROM writer while referring to the states of the flag register (FLG) and the command flag (CDF). The writer mode process is defined as operation in the RAM 3.

<<Boot Mode Process>>

Figure 10:
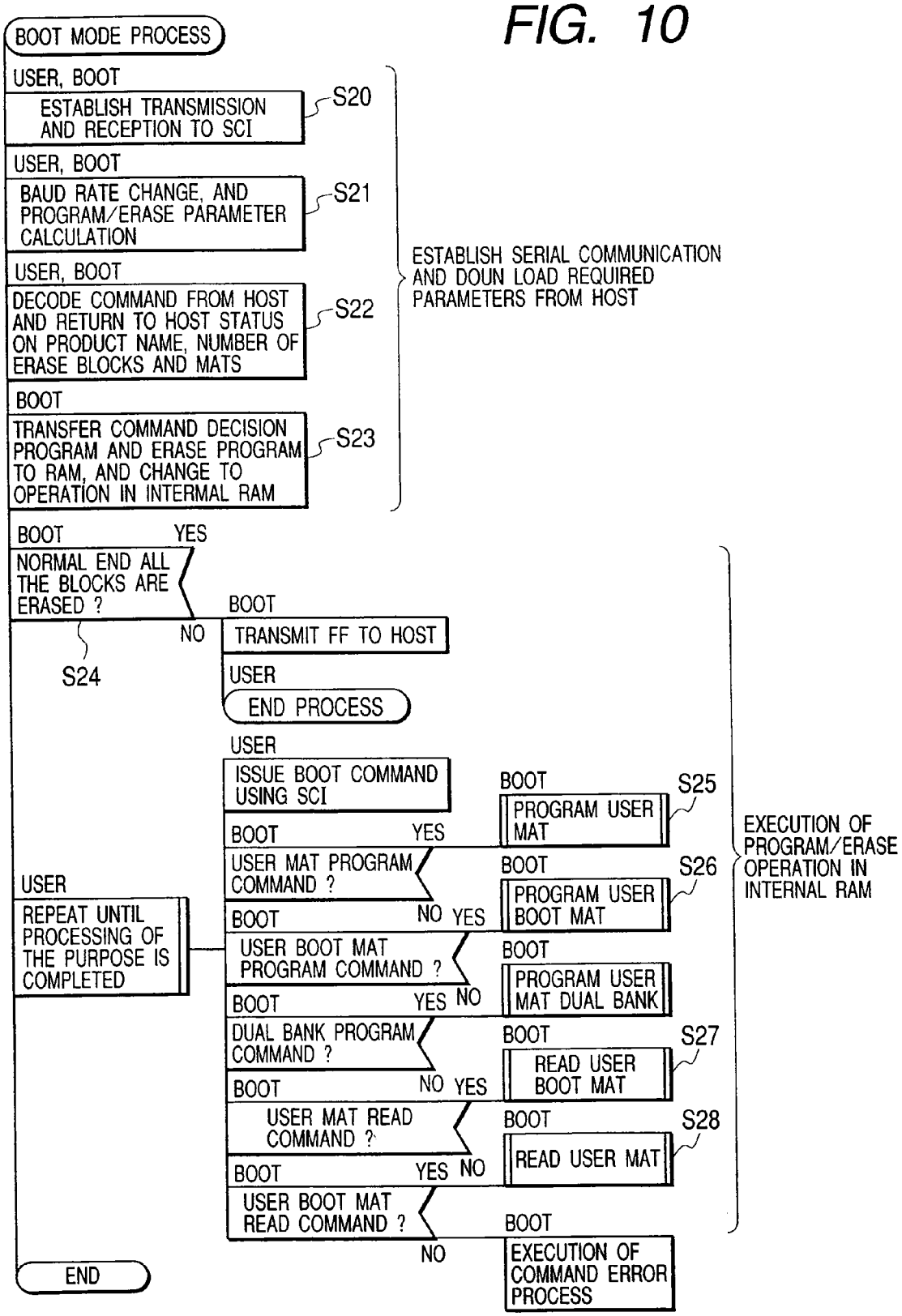
FIG. 10 is a flowchart for describing a boot mode process.

A flowchart for describing a boot mode process is illustrated in FIG. 10 by way of example. Transmission and reception between the serial interface and SCI 12 on board are first established (S20). Required parameters such as an oscillated frequency, etc. for the microcomputer 1 are downloaded and set (S21). Next, a command from a host device is decoded and thereby status such as a product name of a microcomputer, the number of erase blocks and etc., are returned to the host device (S22). A command decision program and an erase program are transferred to the RAM 3 (SCO mode is also available), and the boot mode process changes to operation in the RAM 3 (S23). A user mat Mmat and a user boot mat Umat are subjected to full erasure (S24) and thereafter a user mat program process (S25), a user boot mat program process (S26), a program verify process (S27, S28), etc. are executed in response to the command.

<<User Boot Mode Process>>

Figure 11:
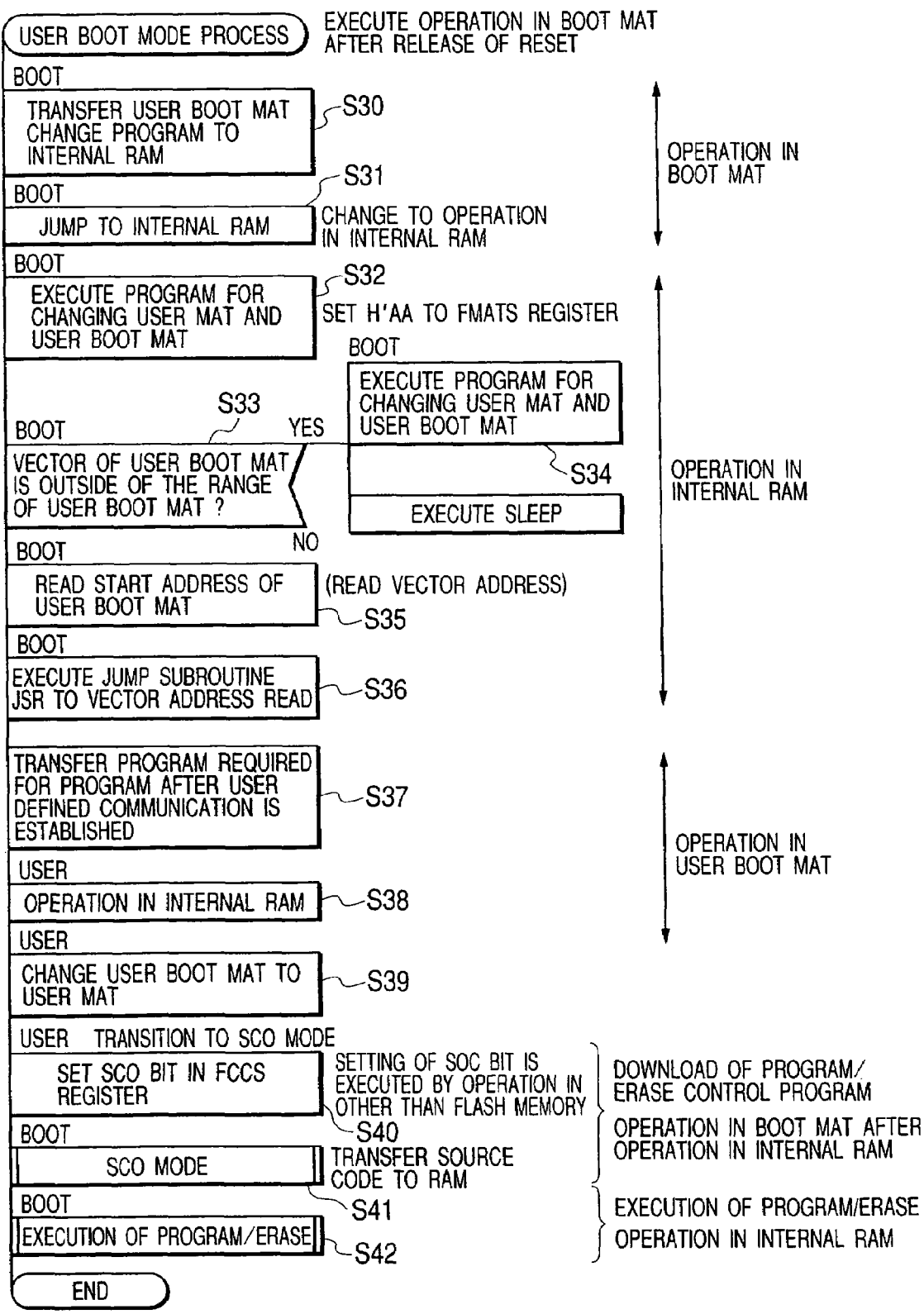
FIG. 11 is a flowchart for describing a user boot mode process.

A flowchart for describing a user boot mode process is illustrated in FIG. 11 by way of example. Although not restricted in particular in the user boot mode, operation is started from a start vector in s boot mat Tmat. A change program to a user boot mat Umat is transferred from the boot mat Tmat to the RAM 3 (S30). A change to operation in the RAM 3 is made (S31). Further, H'AA is set to its corresponding register FMATS, and the specified state (initial value) of user mat by the register FMATS is changed to its corresponding user boot mat (S32). It is now judged whether an error exists in area settings of the user boot mat Umat (S33, S34). If it is judged that there is no error, then a start vector address of the user boot mat Umat is read (S35), and a subroutine is jumped to the read vector address (S36). The CPU 2 executes a program on the user boot mat Umat to thereby firstly establish user defined communications, and transfers a user program required for programming to the RAM 3 (S37). The CPU 2 changes to execution of the program on the RAM 3 (S38) and performs the operation of the register FMATS again. Thereafter, the CPU 2 changes a mat to be processed from the user boot mat Umat to a user mat Mmat (S39). Further, the CPU 2 executes a user program on the RAM 3 to thereby set a control bit SCO to "1" (S40) and proceeds to an SCO mode process, where it transfers an erase and program control program in the boot mat Tmat to the RAM 3 (S41), whereby a program/erase process using the transferred erase and program control program is executed (S42).

<<User Mode Process>>

Figure 12:
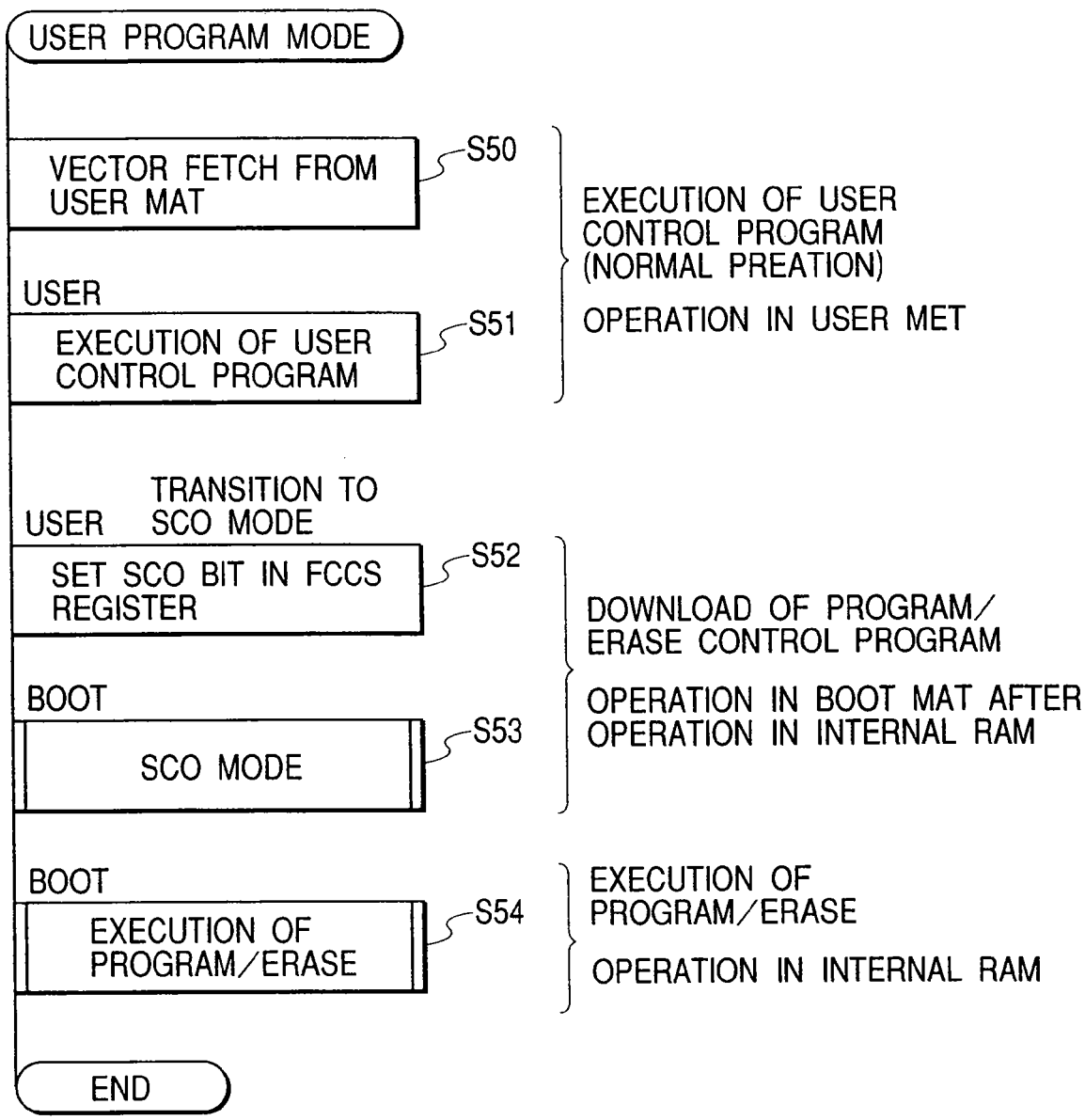
FIG. 12 is a flowchart for describing a user mode process.

A flowchart for describing a user mode process is illustrated in FIG. 12 by way of example. When a user mode is specified, a vector fetch is made from the start of a user mat Mmat (S50) and a user control program is executed (S51). When programming to the user mat Mmat is required during execution of a user program, the CPU 2 performs operation in the RAM 3 to set an SCO bit to "1" (S52) and proceeds to the SCO mode process, thereby transferring an erase and program control program in the boot mat to the RAM 3 (S53), whereby a program/erase process using the transferred erase and program control program is performed (S54).

<<Program/Erase Process>>

Figure 13:
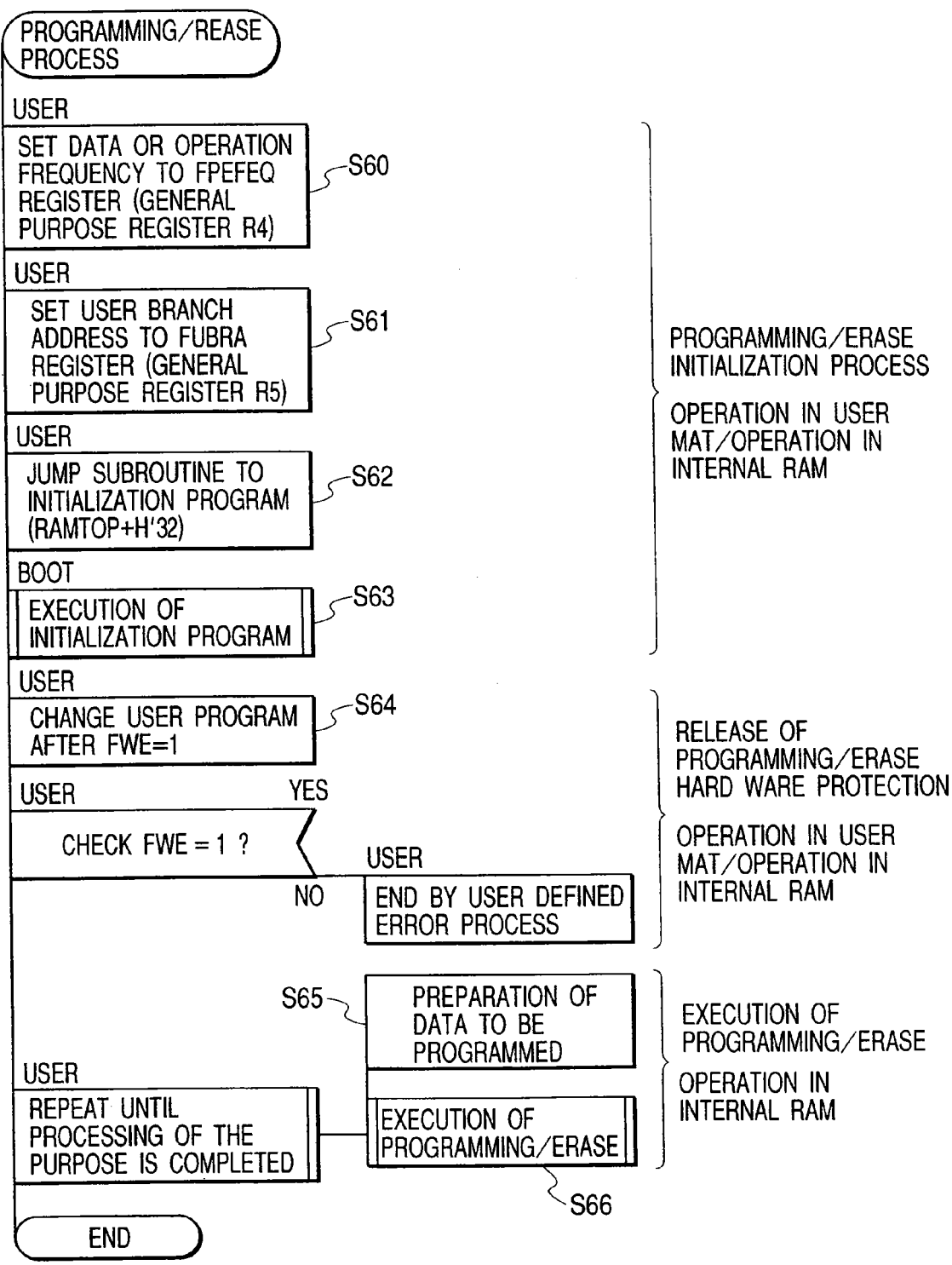
FIG. 13 is a flowchart for describing program/erase processes in Step S42 of FIG. 11 and Step S54 of FIG. 12.

A flowchart for describing a program/erase process shown in each of Steps S42 and S54 referred to above is illustrated in FIG. 13 by way of example. Steps S60 through S63 correspond to a program/erase initialization process. Here, an erase and program control program has been stored in a boot mat Tmat in advance by a maker for the microcomputer 1. In short, the program does not define a condition inherent in a user. For example, the time required to apply each of an erase voltage pulse and a program voltage pulse, for example, is determined according to the characteristic of a flash memory cell. It is however necessary to control the pulse applying time by an operation clock signal for the microcomputer 1. Data about an operation frequency necessary therefor is set to a control register FPEFEQ (S60). Although not restricted in particular, the general purpose register R4 for the CPU 2 is assigned to the control register FPEFEQ.

The erase voltage pulse, the program voltage pulse, and a branch-destination processing address for a user branch process (whose details will be described later) for resolving inconvenience in which a user process is completely disabled during a cycle of a verify operation, are set to a register FUBRA (S61).

Thereafter, a subroutine is jumped to an initialization program region (S62) and an initialization program is executed (S64). According to the contents of the initial setting of the frequency or user branch address, parameters for erase and programming are automatically set onto the erase and program control program.

Next, a control bit FWE is set to a logical value "1" via a terminal Pfwe to release erase/programming hardware hard protection. Consequently, the hard protection is released and a change to execution of a user program is performed (S64). Programming data is prepared in this operation state (S65), and programming/erase that a user desires to perform, is executed (S66). The processes in Steps S65 and S66 are repeated until the user-purposed process is completed.

<<User Branch>>

The user branch process will be explained while the program/erase process of FIG. 13 is being described in further detail.

Figure 14:
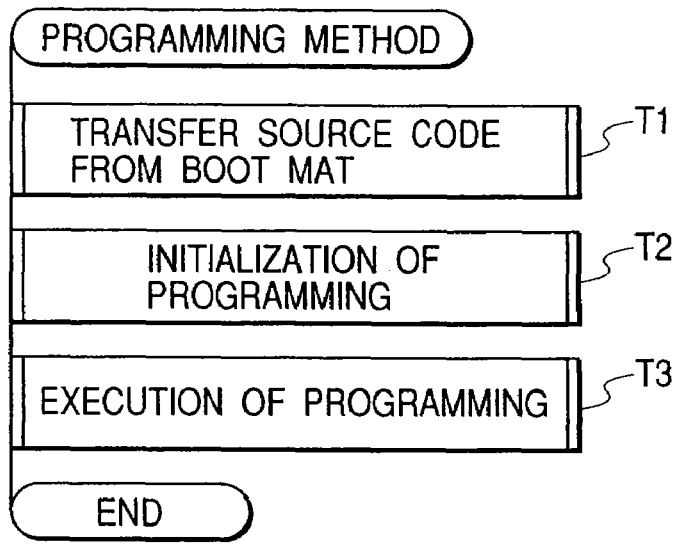
FIG. 14 is a schematic flowchart which focuses attention on a program process of FIG. 13.

FIG. 14 is a schematic flowchart in which attention has been given to the program process of FIG. 13. The program process is roughly divided into a process (T1) for transferring a source code (erase and program control program or the like) from a boot mat Tmat to the RAM 3, execution of the initialization of programming (T2) and execution of programming (T3).

The transfer process (T1) selects a program to be transferred, sets the register FKEY and enables the control bit SCO. By executing it, the transfer program is automatically started form its corresponding boot mat. The program is to be transferred to a required region alone from the start address of the RAM 3. At this time, an initialization program is also transferred.

Upon the execution of the initialization (T2), the initialization program is executed, and the setting of the number of wait time loops depending on an operation frequency and a user branch address are set to the transferred program.

Upon the execution of programming (T3), programming data is transferred onto the RAM 3 before the execution of programming although it may be any mode. At this time, it is necessary to align data in a given determined sequence. A user is able to arbitrarily set a transfer area. After a required procedure has been executed and the transfer of the program data has been performed, a subroutine is jumped to a certain determined address of the program. Programming is executed by execution of such a subroutine jump.

Figure 15:
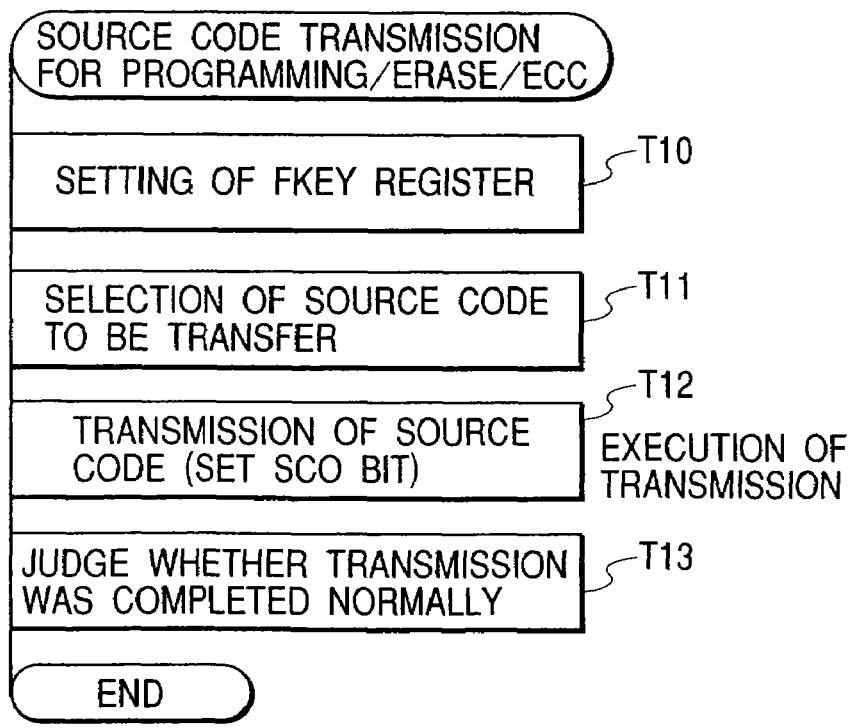
FIG. 15 is a flowchart illustrating details on a transfer process (T1) to a RAM by way of example.

Details on the transfer process (T1) to the RAM 3 are illustrated in FIG. 15 by way of example. The register FKEY is first set to "A5" (T10) and a source code to be transferred is selected (T11). The selection of the source code is effected on the programming/erase related register 30A. Although not restricted in particular, selectable source codes may include a program and program verify program, an erase and erase verify program, etc. Further, the control bit SCO is set to "1" and the selected source code is transferred to a predetermined area of the RAM 3 (T12). When the control bit SCO is enabled, the CPU 2 needs to have operation being in execution outside the flash memory 13. This is because since a mat capable of operation changes from the user mat Mmat to the boot mat Tmat, the program runs away. When the control bit SCO has been enabled, the program is automatically started from the boot mat Tmat. This boot program saves the value of each general purpose register into a stack according to a software process. Upon a return to a user process, the user process is returned according to a return instruction. Before the execution of such a return, a transfer program in the boot mat Tmat serves so as to restore the saved value of the general purpose register. It is finally judged whether transmission was completed normally (T13).

Figure 16:
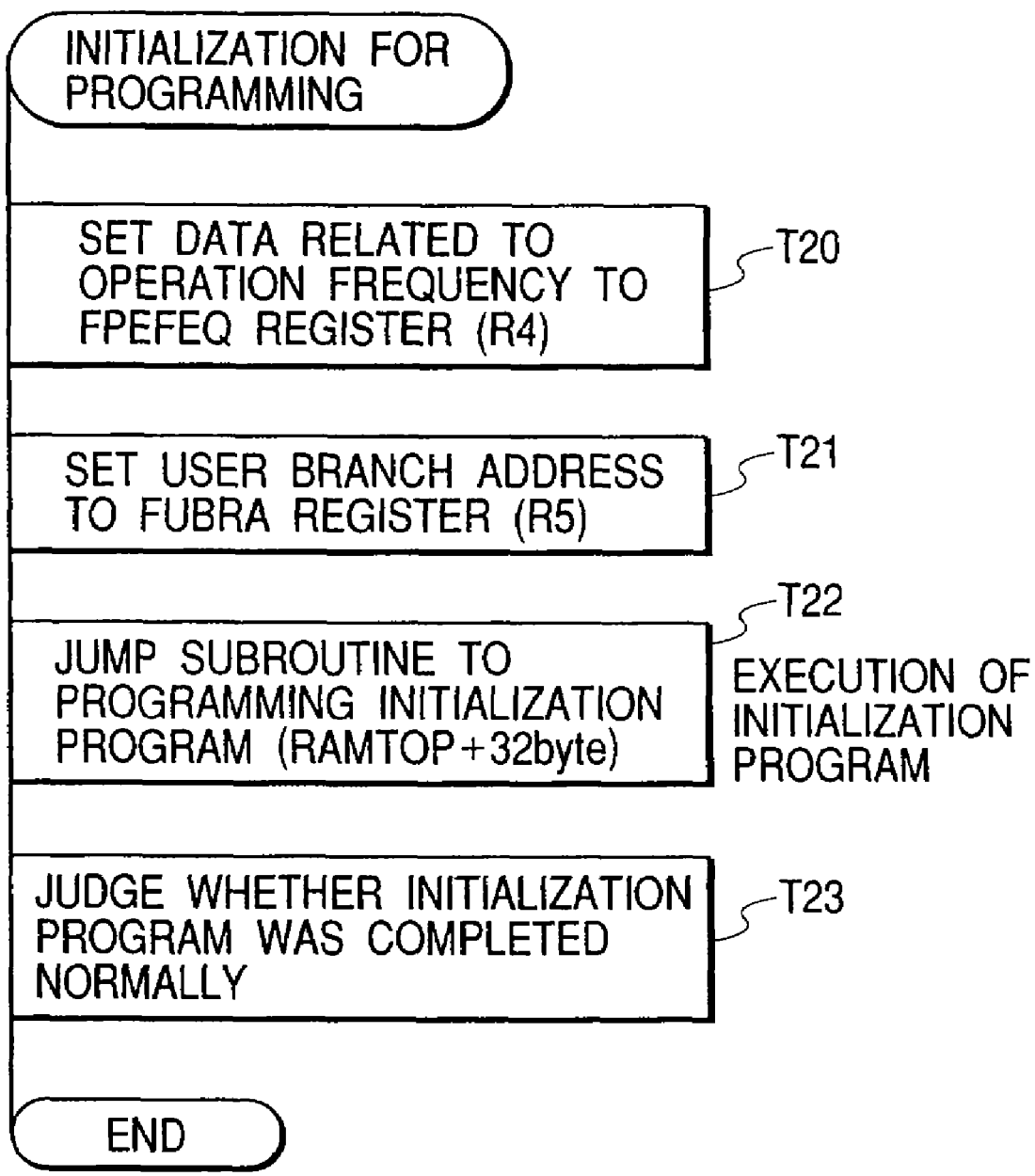
FIG. 16 is a flowchart illustrating by an example, details on a programming initialization process (T2)

Details on the programming initialization process (T2) are illustrated in FIG. 16 by way of example. An operation frequency of the microcomputer 1 is firstly set to the register FPEFEQ (R4) (T20), and a user branch address is set to the register FUBRA. The general purpose register R5 of the CPU 2 is assigned to the register FUBRA. Afterwards, a programming initialization program is executed (T22). A program related initialization program refers to the set value of chip operation frequency and decides the number of wait time loops. A process for embedding the decided wait time interval into the program control program transferred onto the RAM 3 is executed. Further, the programming initialization program executes a user branch by referring to the value of the register FUBRA (R5). Alternatively, when the user branch is executed, a programming program change indicative of to which address it jumps, is executed. In short, the value of the register FUBRA (R5) is embedded into a subroutine jump instruction for executing the user branch, as a branch destination address. It is finally judged whether the initialization process was completed normally (T23), and the present process is terminated.

Now, the register FUBRA is a register for specifying the user branch address in the course of program/erase. This area exists in the general purpose register R5. When it is not desired to execute the user branch, H' 00000000 is set to the present register. In order to avoid the occurrence of a malfunction due to the user branch, it is desirable to prohibit an area in the course of the program/erase in the flash memory from the execution of the user branch, inhibit the user branch effected on an area of a built-in RAM, to which the program/erase program has been transferred, inhibit reprogramming of program data, and inhibit execution of an SCO mode and calling of a program/erase routine and a program/erase initialization routine.

Figure 18:
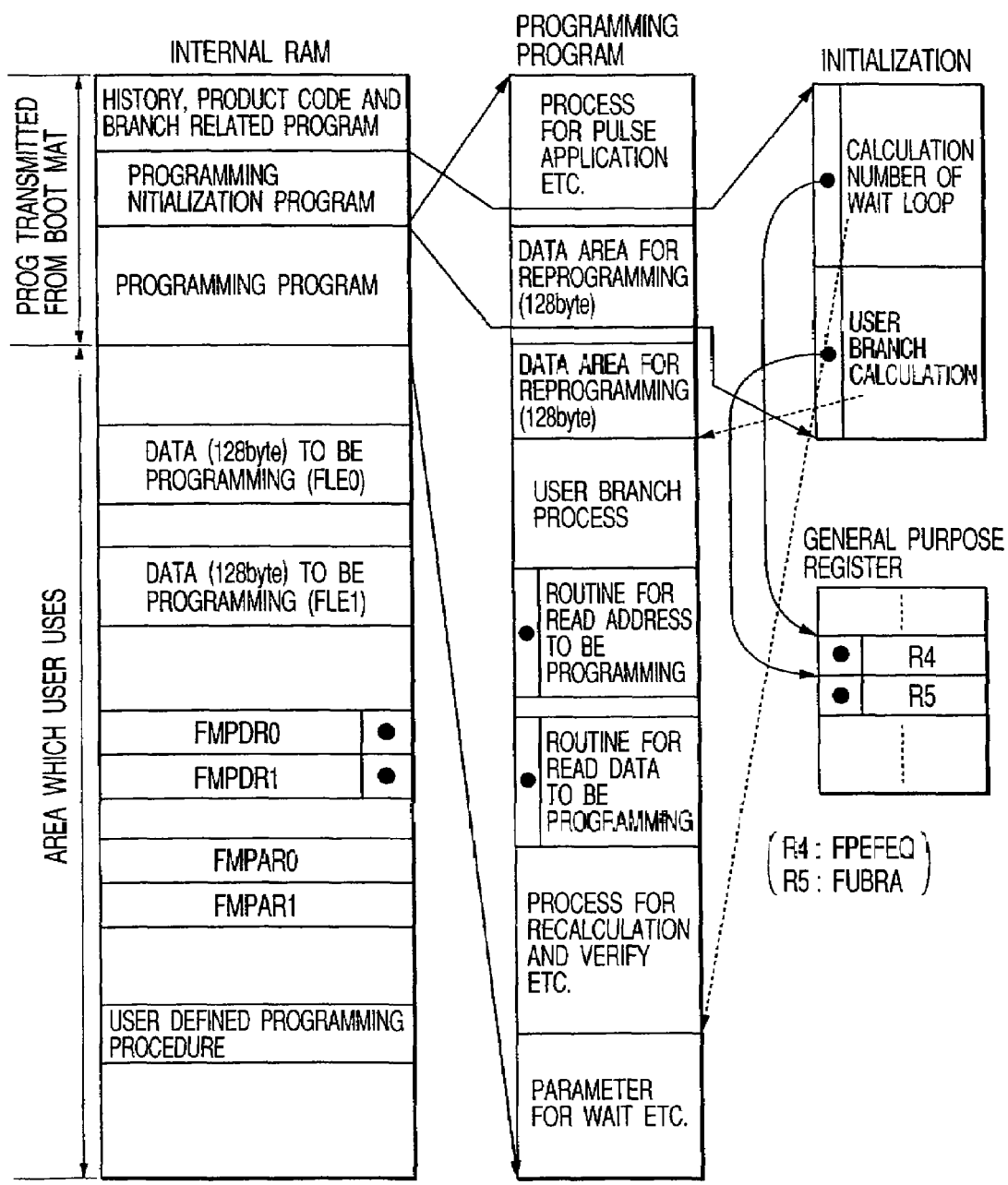
FIG. 18 is an explanatory diagram illustrating by way of example, data connection relations among a built-in RAM, a programming program, an initialization process, and registers (R4 and R5) at the programming initialization of FIG. 16.

Data connection relations among the built-in RAM 3, programming program, initialization process, and registers R4 and R5 at the programming initialization of FIG. 16 are illustrated in FIG. 18. It is apparent from the same drawing that an initialization program refers to the registers R4 and R5, reflects the result of referring on a user branch process of the programming program and reflects it on wait related parameters.

Figure 17:
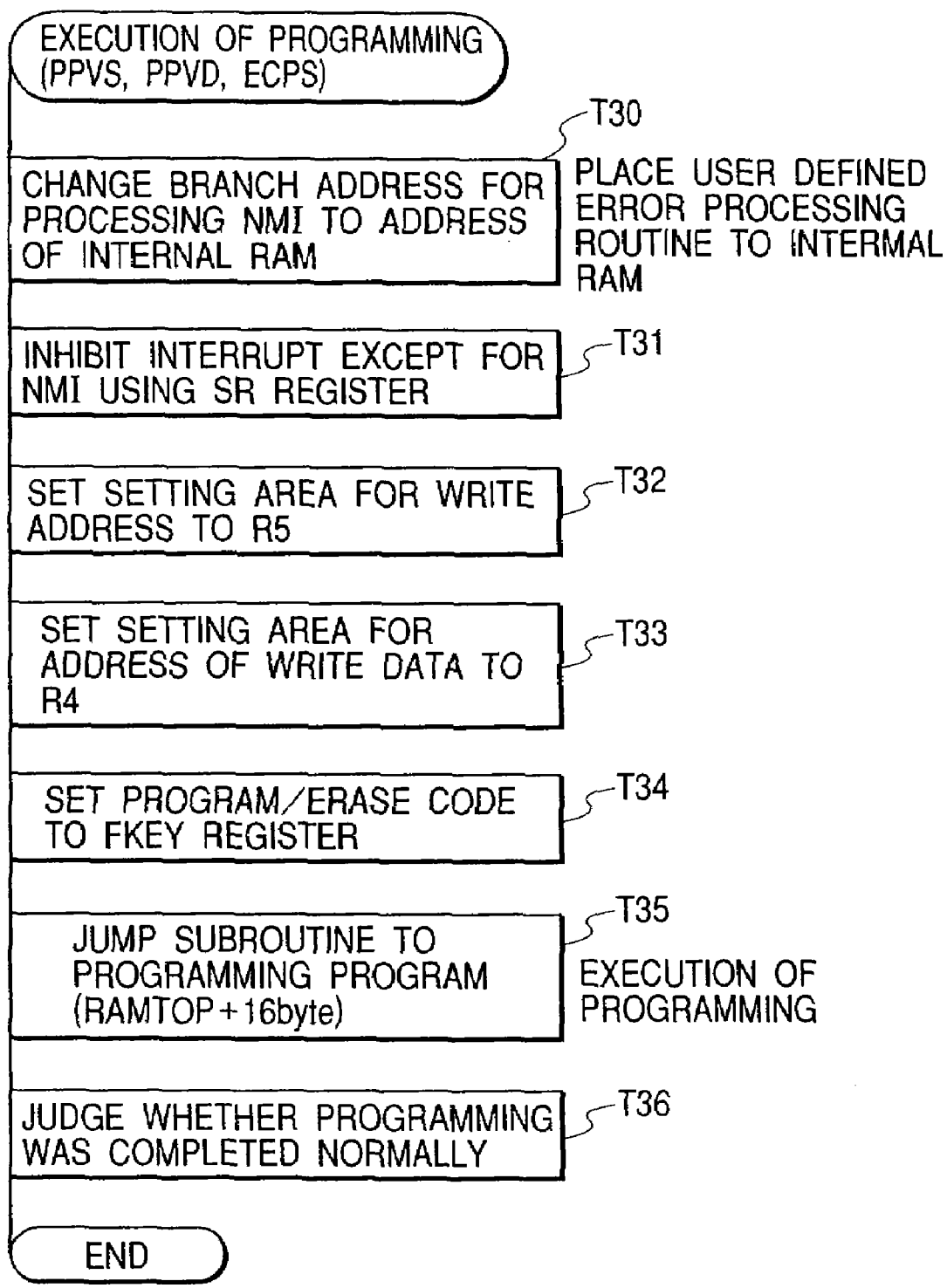
FIG. 17 is a flowchart illustrating by an example, details on a program execution (T3)

Details on the execution of programming (T3) are illustrated in FIG. 17 by way of example. A branch destination at the time that a non-maskable interrupt (NMI) is accepted, is changed to an address area of the RMA 3 (T30). For example, a vector base register may be changed so as to be set to the address area of the RAM 3. This is because a flash memory area being in the course of programming may preferably be avoided or kept off in terms of the prevention of a malfunction. Such an NMI may be utilized to call an error processing routine defined by a user. An interrupt lower in interrupt priority level than the NMI is masked (T31). An interrupt priority level low next to an NMI of interrupt mask data IMSK may be set to the status register SR, for example. This means that a high voltage is being applied to a flash memory according to the state during program/erase. Even if an interrupt such as IRQ or the like is made in this condition, it is not possible to assure that a vector of the flash memory can be read. Thus, interrupts except for the NMI are inhibited during program/erase.

Further, an area for setting a write address is set to the general purpose register R5 (T32). Namely, a start address in a write address area, which has been written in the built-in RAM 3, is set to the general purpose register R5. A setting area for an address of write data is set to the general purpose register R4 (T33). Namely, a start address in a write data address area, which has been written into the built-in RAM 3, is set to the general purpose register R4. Afterwards, a program/erase code "5A" is set to its corresponding register FKEY (T34), and a subroutine is jumped to a programming program, whereby programming is executed (T35). Finally, a judgement is made whether programming was completed normally (T36).

Figure 19:
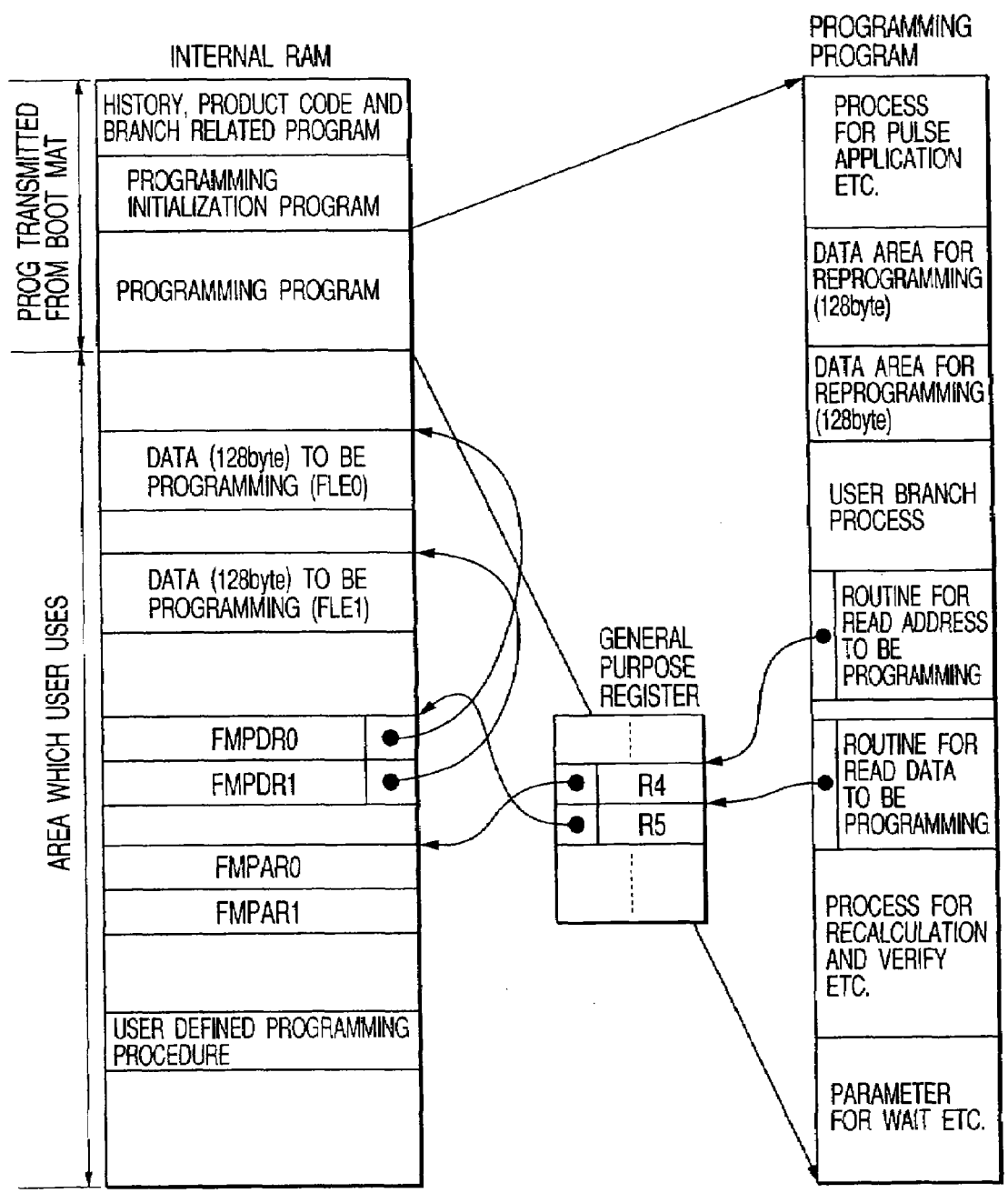
FIG. 19 is an explanatory diagram illustrating by an example, data connection relations among a RAM, general purpose registers (R4 and R5) and a programming program at programming.

Data connection relations among the RAM 3, general purpose registers R4 and R5, and programming program at programming are illustrated in FIG. 19 by way of example. Since dual bank programming is under assumption herein, reference must be made to a start address in a write address area and a start address in a write data address area every their banks. Therefore, RAM areas FMPDR0 and FMPDR1 can be referred to by the register R4, and RAM areas FMPAR0 and FMPAR1 can be referred to by the register R5.

Figure 20:
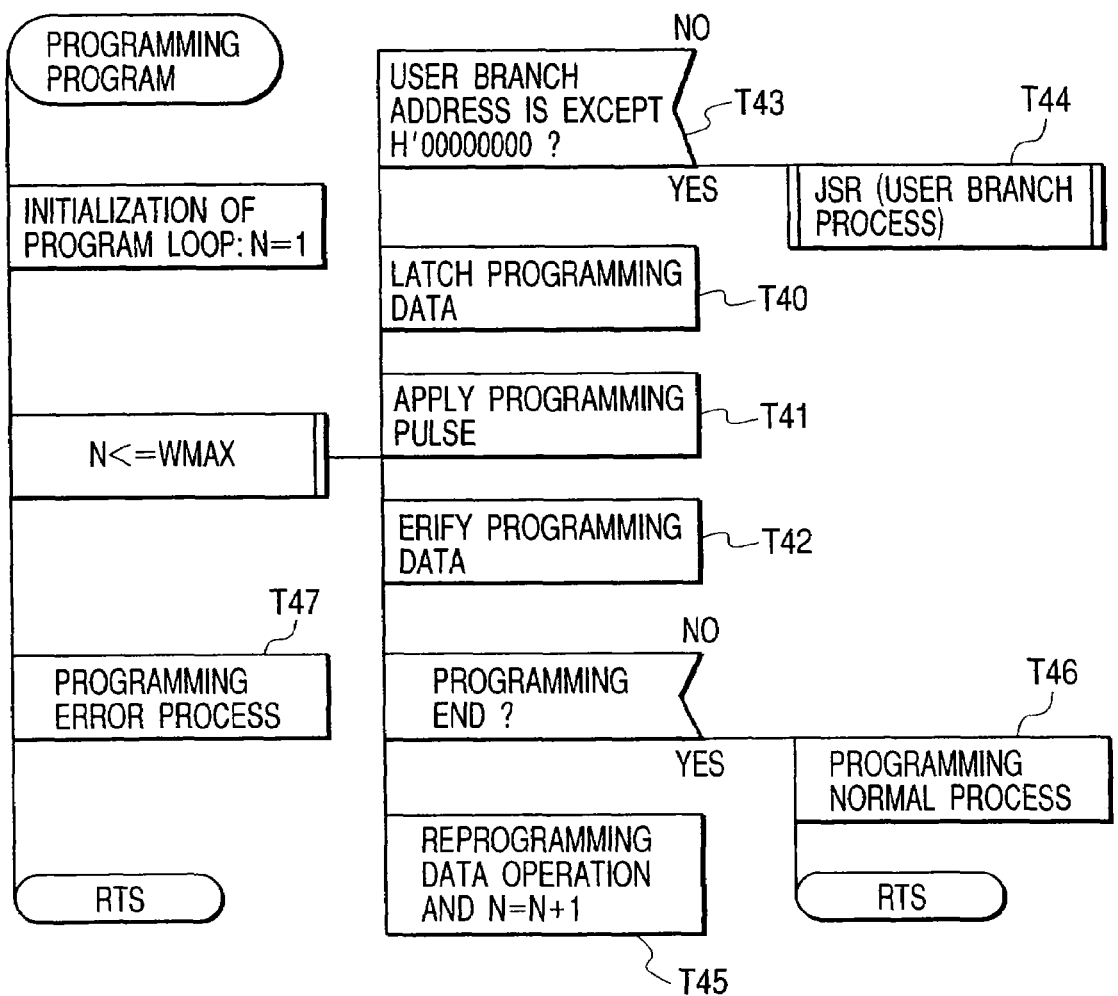
FIG. 20 is a process flow for describing a programming program corresponding to Step S35 of FIG. 17.

A process flow for describing a programming program corresponding to Step S35 of FIG. 17 is illustrated in FIG. 20 by way of example. This process flow includes a step (T53) for judging whether a subroutine is jumped to a user branch address during processing cycles of programming data latch (T50), the application of a programming pulse (T51), and programming verify (T52). When instructions for a subroutine jump is made (when the user branch address is except for H' 00000000) according to a set value based on an initialization process, the programming program branches to the user branch address, where the subroutine is executed (T54). After its execution, it returns to a programming operation routine again. When no predetermined threshold state is obtained upon programming verify, the number of times N that pulses are applied, is incremented and the same loop is repeated again (T55). If a programming normal state is obtained before the number of times that it is repeated, reaches the maximum number of times (WMAX), then this routine procedure returns to the flow of FIG. 17 (T56) at this time. When the programming cannot be completed normally even if the maximum number of times is reached, a programming error process is executed (T57), and the routine procedure returns to the flow of FIG. 17.

Thus, if the programming program is capable of branching to the subroutine process indicated by the user branch address during the cycles of the application of the programming pulse and the programming verify, then the control can be returned to the user control program at certain predetermined intervals even during programming. Further, since the program is executed on a software basis, the intervals at which the control is returned to the user control program, may be changed by software. Owing to the returning of the control to the user control program at the predetermined intervals even during the programming, erase and programming can be executed even without deactivating the system using the microcomputer 1 for a long time. Thus, erase and programming can be effected on a system which needs to confirm internal and external events every predetermined intervals or a system with a learning function, or the like during the execution of a user program.

Figure 21:
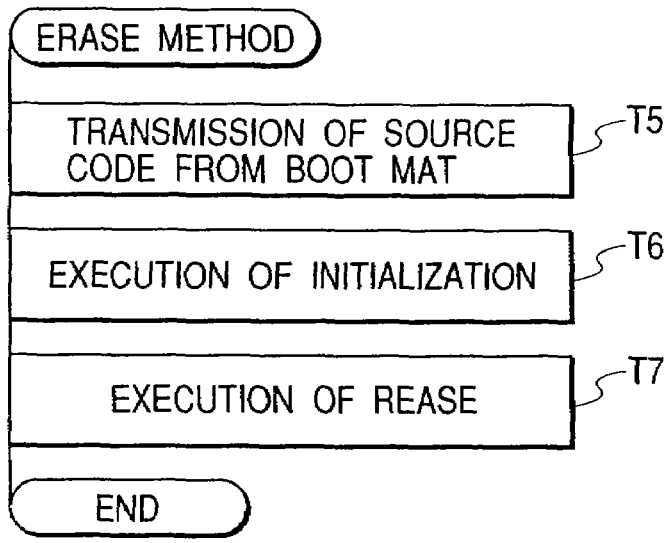
FIG. 21 is a schematic flowchart which focuses attention on the erase process of FIG. 13.

FIG. 21 is a schematic flowchart in which attention is given to an erase process. The erase process is roughly divided into a process for transferring a source code (erase and program control program or the like) from a boot mat to the RAM 3 (T5), execution of erase initialization (T6) and execution of an erase (T7).

The transfer process (T5) is identical to the transfer process (T1). Upon the execution of the initialization (T6), an initialization program is executed for a transferred program for purposes of the setting of the number of wait time loops and the setting of a user branch depending on an operation frequency.

Upon the execution of the erase (T7), the erase is executed by jumping a subroutine to a certain fixed address of an erase program transferred to the RAM 3.

Figure 22:
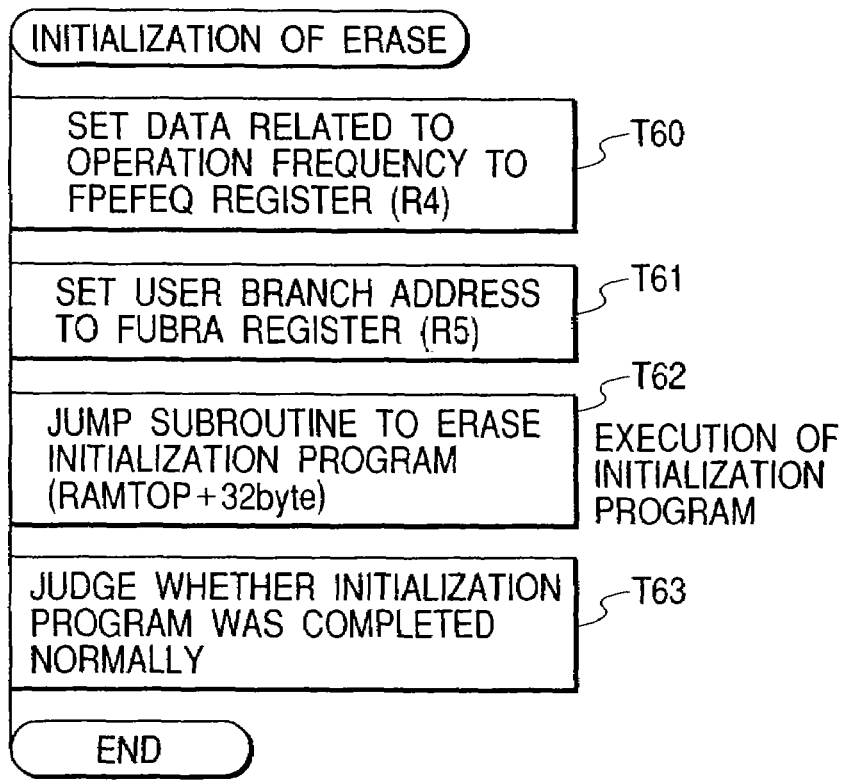
FIG. 22 is a flowchart illustrating details on an erase initialization process (T6) by way of example.

Details on the erase initialization process (T6) are illustrated in FIG. 22 by way of example. An operation frequency of the microcomputer 1 is first set to the register FPEFEQ (R4) T60). A user branch address is set to the register FUBRA (T61). The general purpose register R5 of the CPU 2 is assigned to the register FUBRA. Afterwards, an erase initialization program is executed (T62). In an erase program at its transfer, the number of wait loops is placed in an initially-set state. From this viewpoint, this initialization program is used to thereby change all the numbers of wait loops for the erase program. In order to execute this calculation, a user sets the register FPEFEQ (R4). Upon the setting of the register FUBRA (R5), the setting of a user branch for the erase program is executed. The erase initialization program refers to the set value of the register FUBRA to thereby execute an erase program change as to whether the user branch should be executed or to which address it jumps upon its execution. The user sets a value to the register FUBRA to execute such a change. A judgement is made as to whether the initialization process was completed normally (T63), and the present process is terminated.

Now, the meaning of the register FUBRA is identical to the programming. When it is not desired to execute the user branch, H'00000000 is set to this register.

Figure 24:
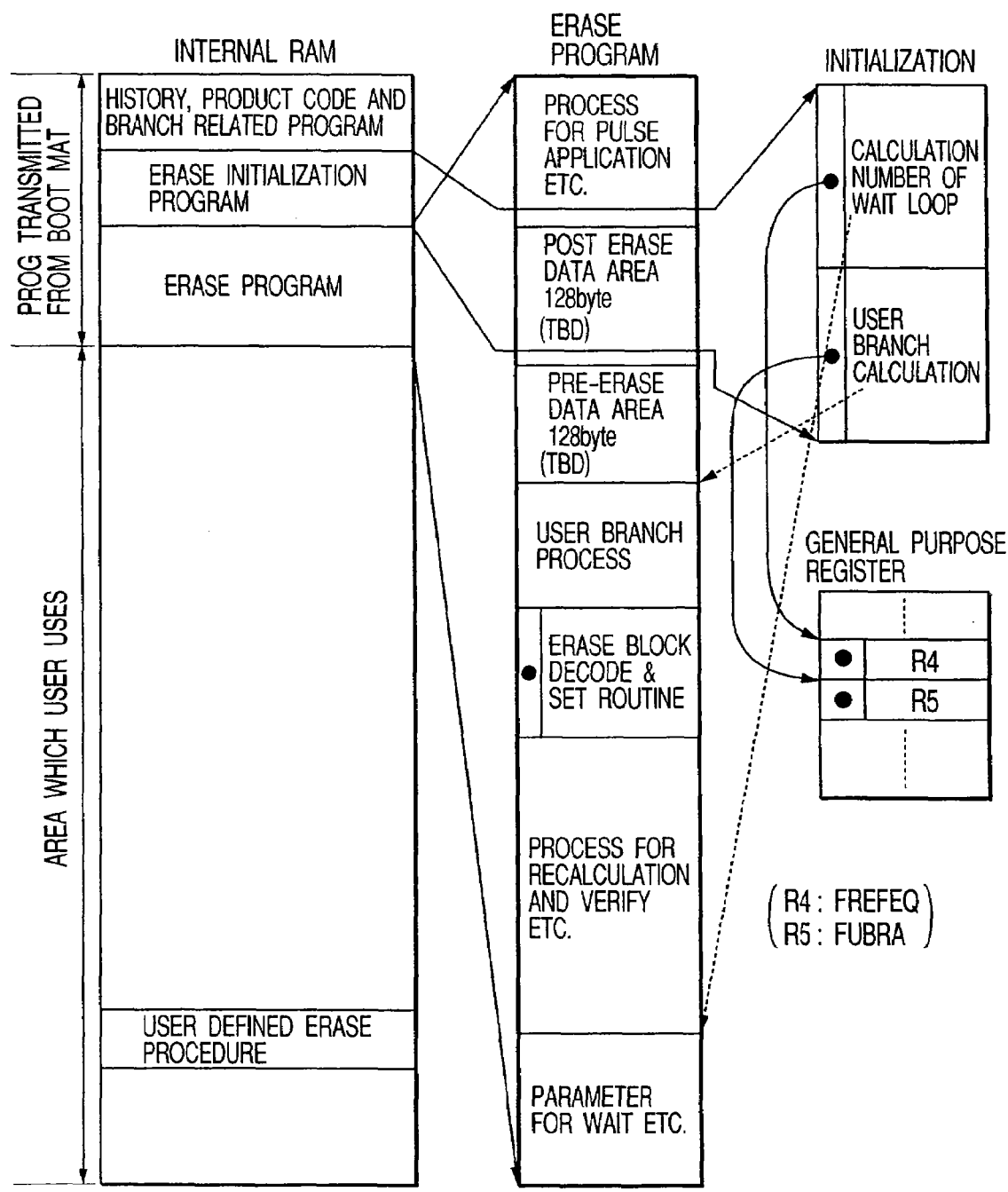
FIG. 24 is an explanatory diagram illustrating by an example, data connection relations among a built-in RAM, an erase program, an initialization process and registers (R4 and R5) at the erase initialization of FIG. 22.

Data connection relations among the built-in RAM 3, erase program, initialization process and registers R4 and R5 at the erase initialization of FIG. 22 are illustrated in FIG. 24. It is apparent from the same drawing that an initialization program refers to the registers R4 and R5, reflects the result of referring on a user branch process of the programming program and reflects it on wait related parameters.

Figure 23:
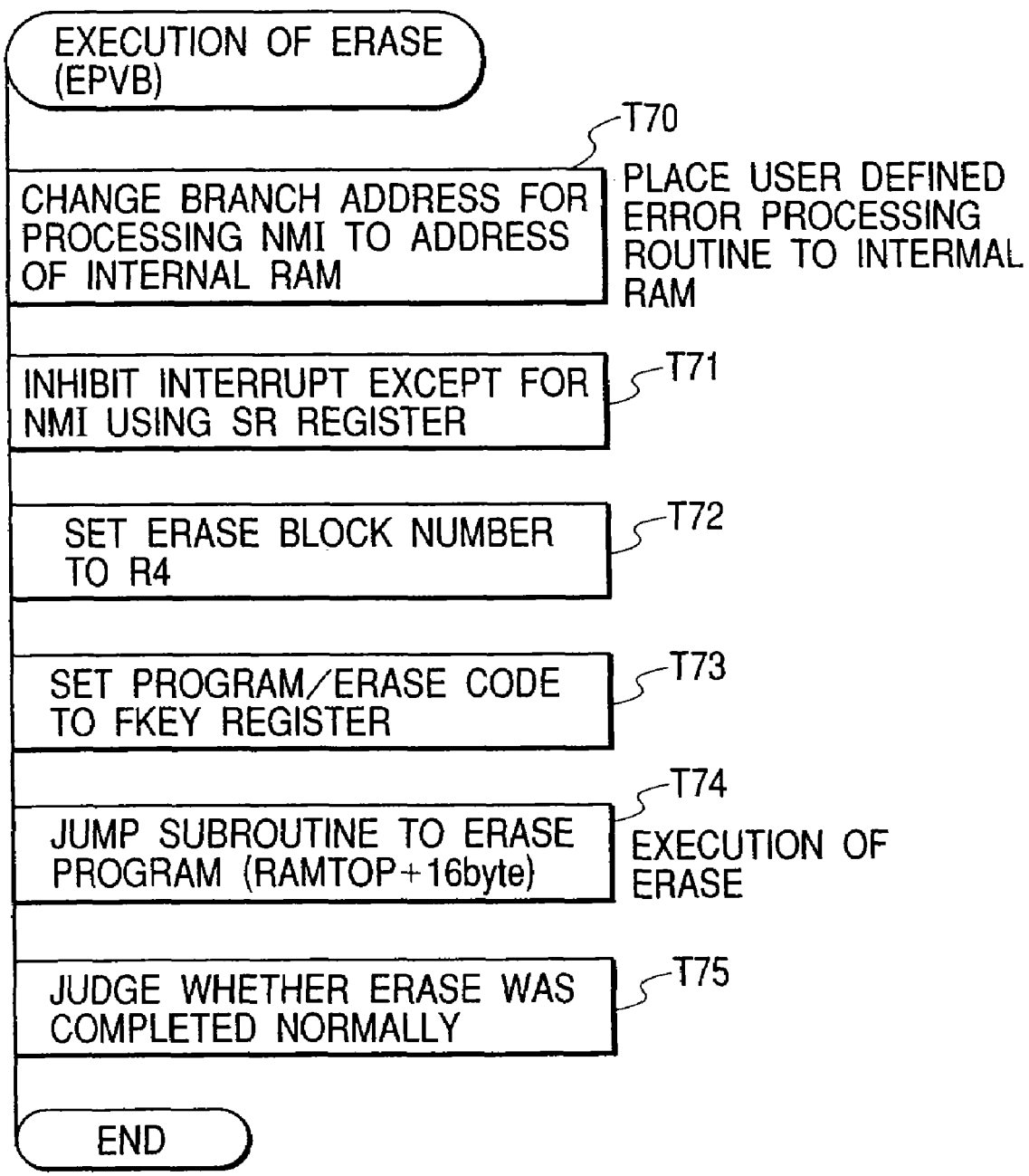
FIG. 23 is a flowchart illustrating details on an erase execution (T7) by way of example.

Details on the erase execution (T7) are illustrated in FIG. 23 by way of example. A branch destination at the time that a non-maskable interrupt (NMI) is accepted, is changed to an address area of the RMA 3 (T70). For example, a vector base register may be changed so as to be set to the address area of the RAM 3. This is because a flash memory area being in the course of erasing may preferably be avoided or kept off in terms of the prevention of a malfunction. Such an NMI may be utilized to call an error processing routine defined by a user. An interrupt lower in interrupt priority level than the NMI is masked (T71). An interrupt priority level low next to an NMI of interrupt mask data IMSK may be set to the status register SR, for example. This means that a high voltage is being applied to a flash memory according to the state during the erasing. Even if an interrupt such as IRQ or the like is taken in this condition, it is not possible to assure that a vector of the flash memory can be read. Thus, interrupts except for the NMI are inhibited during the erasing.

Further, an erase block number is set to the general purpose register R4 (T72). Afterwards, a program/erase code "5A" is set to the register FKEY (T73), and a subroutine is jumped to an erase program (T74). It is finally judged whether the erase was completed normally (T75).

Figure 25:
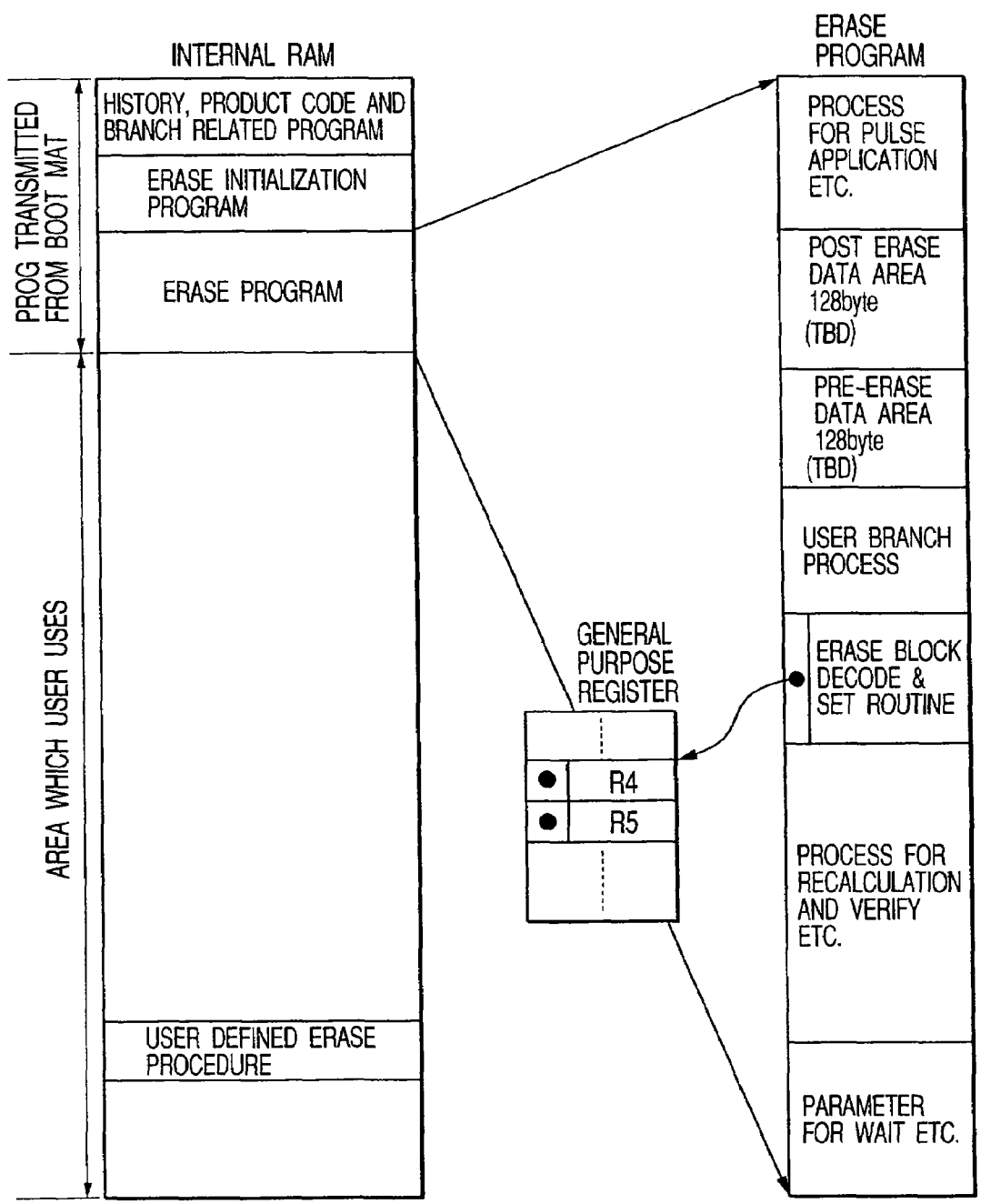
FIG. 25 is an explanatory diagram illustrating by way of example, data connection relations among a RAM, general purpose registers (R4 and R5) and an erase program at erasing.

Data connection relations among the RAM 3, general purpose registers R4 and R5 and erase program at erasing are illustrated in FIG. 25 by way of example. Since the -user does not create the erase program, such connection relations are used as an interface method for erase mat selection, i.e., the delivery of the erase block selection is executed by delivering an erase block number via the register FEBS (R4).

Figure 26:
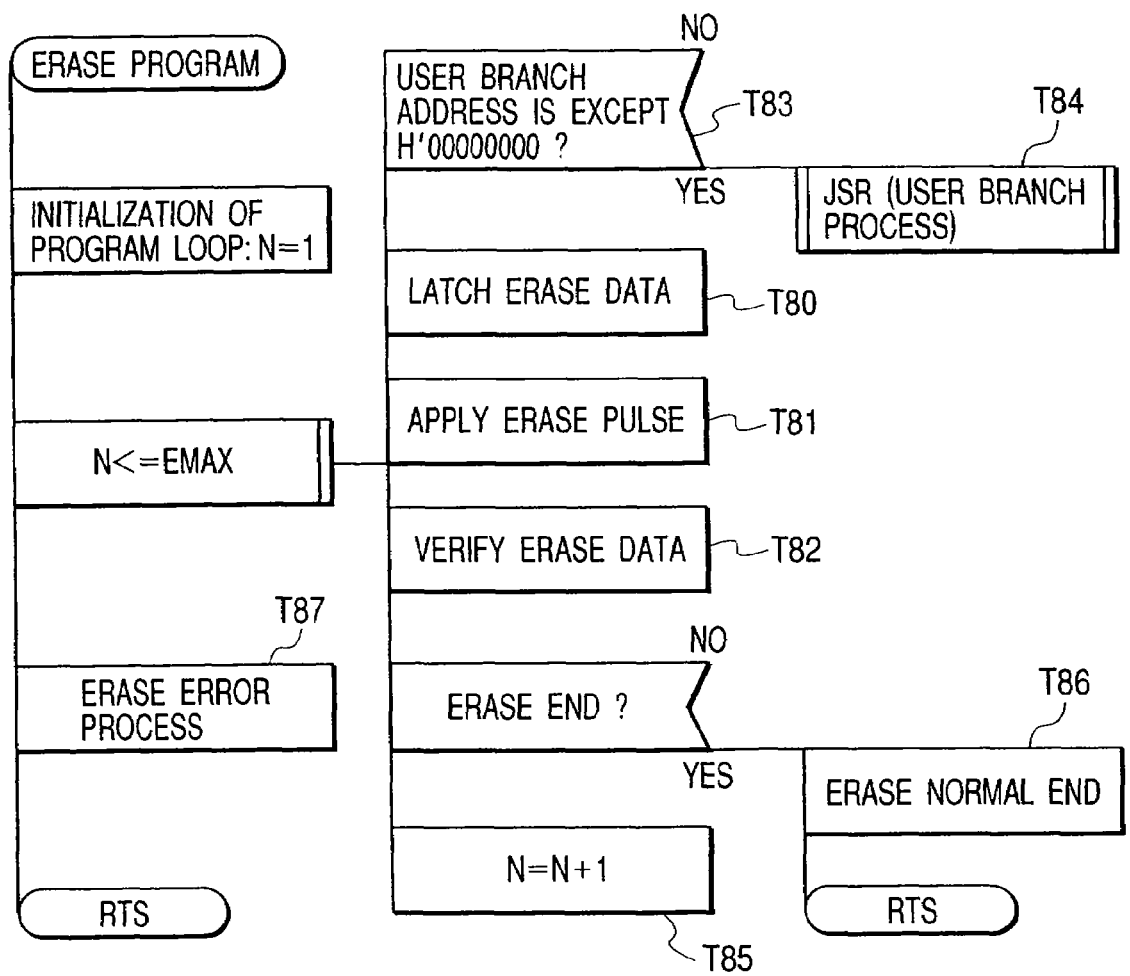
FIG. 26 is a process flow for describing an erase program corresponding to Step T74 of FIG. 23.

A process flow for describing an erase program corresponding to Step T74 of FIG. 23 is illustrated in FIG. 26 by way of example. This process flow includes a step (T83) for judging whether a subroutine is jumped to a user branch address during processing cycles of erase data latch (T80), the application of an erase pulse (T58), and erase verify (T82). When instructions for a subroutine jump is made (when the user branch address is except for H' 00000000) according to a set value based on an initialization process, the erase program branches into the user branch address, where the subroutine is executed (T84). After its execution, it returns to an erase operation routine again. When no predetermined threshold state is obtained upon erase verify, the number of times N that pulses are applied, is incremented and the same loop is repeated again (T85). If an erase normal state is obtained before the number of times that it is repeated, reaches the maximum number of times (EMAX), then this routine procedure returns to the flow of FIG. 23 at this time (T56) When the erasing cannot be completed normally even if the maximum number of times is reached, an erase error process is executed (T87), and the routine procedure returns to the flow of FIG. 23.

Thus, if the erase program is capable of branching to the subroutine process indicated by the user branch address during the cycles of the application of the erase pulse and the erase verify, then the control can be returned to the user control program at certain predetermined intervals even during erasing. Owing to the returning of the control to the user control program at the predetermined intervals even during the erase, the erase can be executed even without deactivating the system using the microcomputer 1 for a long time. Thus, erase and programming can be effected on a system which needs to confirm internal and external events every predetermined intervals or a system with a learning function, or the like during the execution of a user program.

<<Runaway of Program at User Branch Destination>>

Figure 27:
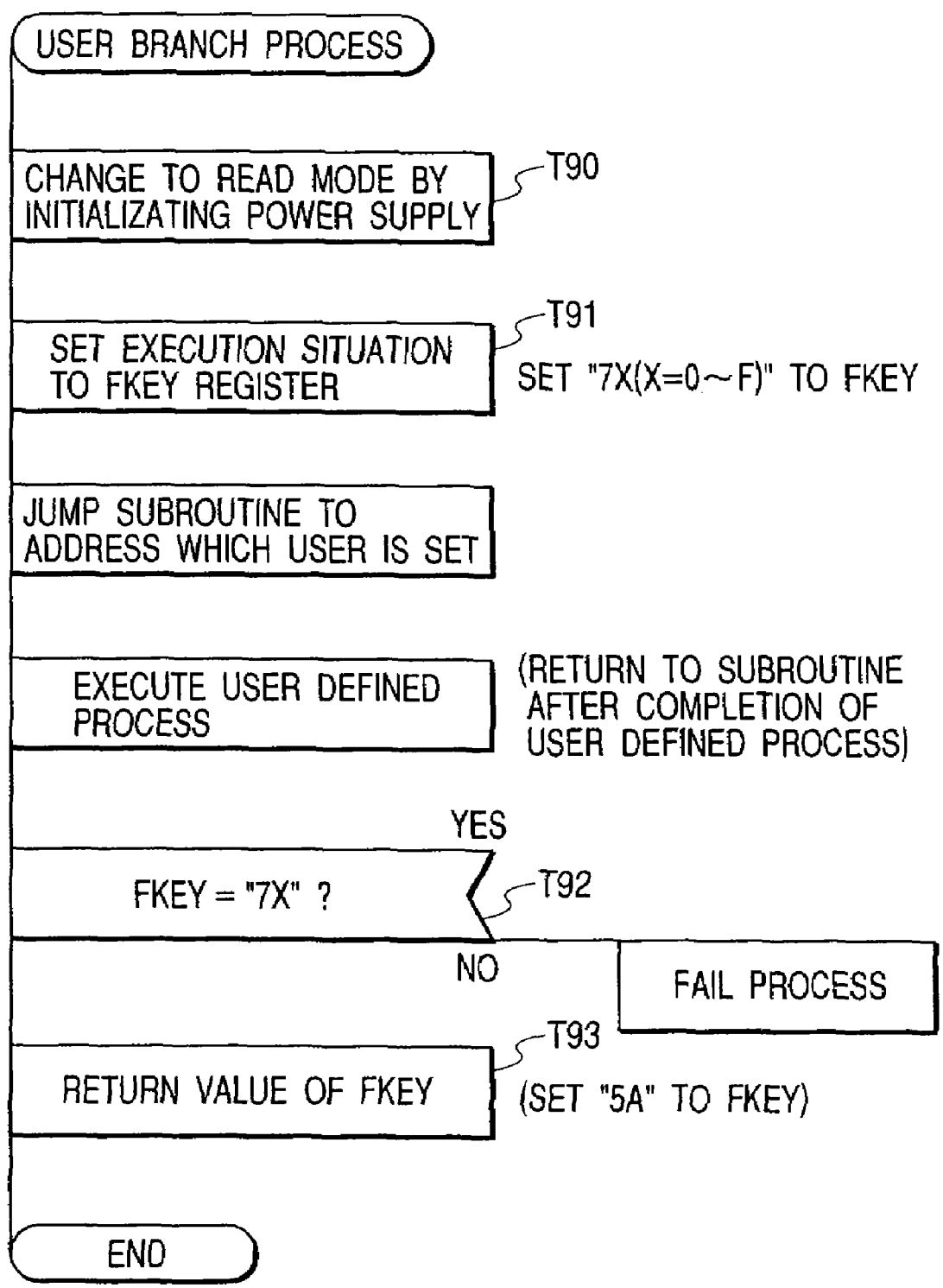
FIG. 27 is a flowchart for describing a user branch process for enabling inhibition of a state in which information stored in a flash memory is destructed due to a runaway of CPU at a user branch destination.

When the programming/erase program is in a transferred state and the terminal Pfwe is in an enable state ("1"), it is difficult to completely assure that the stored information held in the flash memory 13 is held normally in any case. A program/erase processing method capable of inhibiting the situation that the CPU 2 runs away at a user branch destination and thereby the information stored in the flash memory 13 is destroyed, is illustrated in FIG. 27. Namely, according to the user branch process corresponding to each of Steps T44 and T84, which is executed for each process termination during the program/erase flow, an operating power supply for programming/erase is initialized to make a change to an operating power supply for a read operation (90). Afterwards, the value of the register FKEY is changed to an arbitrary value other than a programmable/erasable value "5A" (T91). It is used as 7X (X=0~F), for example. Since the setting of the control bit SWE is disabled owing to the execution thereof, the program/erase cannot be executed briefly even if the CPU runs away at the user branch destination.

If a code set to the register FKEY is set as a code meaningful to processing, e.g., a code indicative of the progress of erase/program in the process of Step T91, then a malfunction or failure can be detected by reference to the value of the register FKEY where the routine procedure is returned from the program/erase processing routine in a program/erase non-completed state or where the value of the register FKEY is changed to a value other than an expected value due to a runaway or the like. In the example illustrated in FIG. 27, "71" is set between the application of a pulse and verify, "72" is set between the verify and re-computation of programming data, and "73" is set between the re-computation and dummy write prior to the application of a program pulse. When the present procedure escapes from the user branch process, a judgement is made as to whether the value of the register FKEY indicates "7X (X=1~7) (T92). If it is found to be other than it, it is then judged that some abend or failure has occurred, and thereby a fail process is effected on the program/erase (T93). If FKEY is equal to "7X", then the process is regarded as have been terminated normally, and FKEY is returned to "5A" (T93).

Incidentally, FKEY may not be used as the register, which holds the work progress. However, if consideration is given to the situation that it is advisable to reprogram the value of FKEY into the value other than "5A" in the case of a user branch, then the utilization of the register FKEY is economical for both aspects of a hardware resource and a process load.

While the invention made above by the present inventors has been described specifically by the illustrated embodiments, the present invention is not limited to the embodiments. It is needless to say that various changes can be made thereto within the scope not departing from the substance thereof.

For example, an erasable and programmable non-volatile memory is not limited to a binary flash memory. It may be a multi-valued flash memory, e.g., a multi-valued flash memory capable of allowing one flash memory to hold stored information of 2 bits or more. Namely, one flash memory cell is a memory in which information stored in one flash memory cell is represented in plural bits, which memory is set to one of four types or more of threshold voltages specified by programming data of plural bits upon information storage and outputs the state of the threshold voltage as its corresponding stored information of plural bits upon information reading. A flash memory capable of writing 2-bit information into one flash memory cell and reading the information is illustrated as one example herein. In a multi-valued information storage technology intended to realize such a flash memory, an information stored state of one memory cell is set to one selected from, for example, an erase state ("11"), a first program state ("10"), a second program state ("00"), and a third program state ("01"). The information stored states of four types in total are defined as states determined according to 2-bit data. Namely, one memory cell stores 2-bit data therein.

The flash memory cell is not limited to a vertical stacked structure of a floating gate and a control gate. Such a device structure or the like that a gate electrode of a MOS transistor is formed as a floating gate electrode, and a channel region is used as a control gate via a MOS gate capacitance formed by allowing the gate electrode to extend, may be adopted. Further, the non-volatile storage element is not limited to the flash memory. It may be a non-volatile memory like an EEPROM (Electrically Erasable and Programmable Read Only Memory) in which MNOS (Metal Nitride Oxide Semiconductor) transistors are formed as storage elements, or a ferroelectric memory or the like.

A circuit module included in a microcomputer on an on-chip basis is not limited to the above example. It may be suitably changed.

No limitation is imposed to such a configuration that the erase and program control program is initially held in a boot mat. Such a configuration that it is downloaded from a system board, may be adopted. Further, the various register means may be peripheral registers each with a built-in flash memory, general purpose registers each having a CPU built therein, or memory mapped I/O registers each comprising a memory such as an SRAM or the like.

The user branch has been described as the case in which the initialization process for reprogramming the jump-destined code for the jump subroutine instruction in advance is carried out based on the set value of the register FUBRA (R5) and thereafter its program is executed. As an alternative to it, the register FUBRA (R5) may be allowed to branch by being directly referred to by the jump subroutine instruction. In this case, a compiler for its erase and program control program must be able to refer to the general purpose register R5 within a limited range of the number of general purpose registers available as an argument within one function.

An advantageous effect obtained by a typical one of the inventions disclosed in the present application will be described in brief as follows:

A program jumped to a subroutine corresponding to an address specified by a user is programmed in advance during a loop of the application of a high voltage pulse and data verify or the like. If a user passes a jump-destined address as an argument upon execution of a program, for example, then the address can be referred to by a jump subroutine instruction. Therefore, control can be returned to a user control program at certain predetermined intervals even during erase/programming for a non-volatile memory. Thus, erase/programming for an on-chip non-volatile memory can be carried out as necessary during its process even in the case of a system, which needs to respond to events developed at intervals each shorter than an erase/program process time.

What is claimed is:

1. A data processing apparatus comprising:
a central processing unit;
a nonvolatile memory;
a volatile memory; and
an interface circuit for coupling to an ATAPI interface,
wherein the central processing unit is capable of performing a data writing operation for the nonvolatile memory,
wherein in the data writing operation, the central processing unit performs control to receive write data from the ATAPI interface via the interface circuit, to store the write data into the volatile memory, and thereafter to write the write data stored in the volatile memory into the nonvolatile memory, and
wherein the central processing unit is adapted to accept an interrupt having higher level than a predetermined level during performance of the data writing operation.

2. A data processing apparatus according to claim 1,
wherein the central processing unit performs the data writing operation by executing a data writing program,
wherein, before performance of the data writing operation, the data writing program is transferred from a part of the nonvolatile memory to the volatile memory, and
wherein in performing the data writing operation, the central processing unit fetches an instruction of the data writing program from the volatile memory.

3. A data processing apparatus according to claim 2,
wherein an address to be branched to in accordance with accepting the interrupt is set in an address of the volatile memory during performance of the data writing operation.

4. A data processing apparatus according to claim 3,
wherein the nonvolatile memory is divided to plural address areas,
wherein a first area of the plural address areas of the nonvolatile memory is used for storing the data writing program, and a second area of the plural address areas is used for storing the write data received from the ATAPI interface.

5. A data processing apparatus according to claim 4,
wherein before writing the write data to the nonvolatile memory, the central processing unit is capable of performing an erase operation for erasing data already stored in the second area.

6. A data processing apparatus according to claim 5,
wherein the write data received from the ATAPI interface is a user program.

7. A data processing apparatus according to claim 1,
wherein the central processing unit, the nonvolatile memory, the volatile memory, and the interface circuit are structured on one semiconductor substrate.

* * * * *